US009888780B2

(12) United States Patent
Rabin

(10) Patent No.: US 9,888,780 B2
(45) Date of Patent: Feb. 13, 2018

(54) HOLDER APPARATUS FOR DETACHABLE COUPLING TO FOLD DOWN TRAY TABLE

(71) Applicant: MR. CER TECH CORPORATION, Kirkland, WA (US)

(72) Inventor: Craig Rabin, Kirkland, WA (US)

(73) Assignee: Craig Rabin, Seattle, WA (US)

( * ) Notice: Subject to any disclaimer, the term of this patent is extended or adjusted under 35 U.S.C. 154(b) by 0 days.

(21) Appl. No.: 15/308,584

(22) PCT Filed: May 1, 2015

(86) PCT No.: PCT/US2015/028874
§ 371 (c)(1),
(2) Date: Nov. 2, 2016

(87) PCT Pub. No.: WO2015/171462
PCT Pub. Date: Nov. 12, 2015

(65) Prior Publication Data
US 2017/0049239 A1     Feb. 23, 2017

Related U.S. Application Data

(60) Provisional application No. 61/988,190, filed on May 3, 2014, provisional application No. 62/131,720, filed on Mar. 11, 2015.

(51) Int. Cl.
*A47K 1/08*     (2006.01)
*A47C 7/70*     (2006.01)
(Continued)

(52) U.S. Cl.
CPC ............... *A47C 7/70* (2013.01); *A47C 7/68* (2013.01); *B60N 3/002* (2013.01); *B60N 3/10* (2013.01); *B60N 3/103* (2013.01)

(58) Field of Classification Search
CPC ... B64D 11/00152; B60N 3/007; F16M 11/24
See application file for complete search history.

(56) References Cited

U.S. PATENT DOCUMENTS 4,770,107 A     9/1988  Miller
5,953,999 A *   9/1999  Kanehl .................. B60N 3/007
108/44

(Continued)

FOREIGN PATENT DOCUMENTS

CN         201659910 U      12/2010
WO          00/71384 A1     11/2000
WO        2009/040079 A2     4/2009

OTHER PUBLICATIONS

International Search Report, dated Aug. 20, 2015, for PCT/US2015/028874, 3 pages.
(Continued)

*Primary Examiner* — Amy J. Sterling

(57) ABSTRACT

A holder apparatus includes a platform having a primary aperture sized to supportingly receive a drinking cup partially extending therethrough; a supporting hook having an opening sized and shaped to receive an edge of a fold down tray table therein, the supporting hook which at least in use is physically coupled to the platform to support the platform from the fold down tray table while the fold down tray table is in an upright configuration; a device retention hook sized and shaped to receive an edge of a portable electronic device; and a bias member that physically couples the device retention hook to at least one of the platform or the supporting hook and which biases the device retention hook toward the platform when the portable electronic device is positioned between the device retention hook and at least one of the platform or the supporting hook.

14 Claims, 26 Drawing Sheets

(51) Int. Cl.
  *A47C 7/68* (2006.01)
  *B60N 3/10* (2006.01)
  *B60N 3/00* (2006.01)

(56) References Cited

U.S. PATENT DOCUMENTS

| | | |
|---|---|---|
| 2003/0121943 A1 | 7/2003 | Chou |
| 2016/0161052 A1* | 6/2016 | Griggs .................. F16M 11/24 320/108 |
| 2016/0257404 A1* | 9/2016 | Ferris ............... B64D 11/00152 |

OTHER PUBLICATIONS

Written Opinion, dated Aug. 20, 2015, for PCT/US2015/028874, 11 pages.

\* cited by examiner

US 9,888,780 B2

HOLDER APPARATUS FOR DETACHABLE COUPLING TO FOLD DOWN TRAY TABLE

BACKGROUND

Technical Field

The present disclosure generally relates to holder apparatuses. More particularly, the present disclosure relates to holder apparatuses for detachable coupling to support structures.

Description of the Related Art

Certain seats include a fold down tray table on a rear side of the seat. As an example, seats in certain mass transportation vehicles such as airplanes, buses, trains, or other such vehicles include seats with fold down tray tables on a rear side thereof. A passenger seated in a second seat behind a first seat can operate or otherwise interact with a fold down tray table on the rear side of the first seat.

The fold down tray table is movable between an upright position and a deployed position. For example, the tray table is attached to the seat using one or more hinges or hinged joints. In the upright position, the tray table is held parallel or adjacent to a rear side of the seat in a substantially vertical direction. For example, a latch connected to the rear side of the seat holds or locks the tray table in the upright position. The latch may be rotatable to selectively engage or disengage the tray table. In the deployed position, the tray table folds out or down from the rear side of the seat to provide a small table in a substantially horizontal direction. A passenger uses the small table to hold or otherwise support items such as a drinking cup, a writing implement, a portable electronic device, a magazine, or other items.

BRIEF SUMMARY

Mass transportation vehicles are often limited in space and feature rows of seats tightly positioned together. Therefore, a passenger in such a seat has only limited space between her and the seat in front of her. Having the fold down tray table in the deployed position may serve to reduce or otherwise occupy such already limited space. Therefore, deploying the fold down tray table may result in the passenger feeling uncomfortable or crowded. Such may be particularly true when the seat in front of the passenger is in the reclined position.

As such, the passenger may be reluctant to deploy the tray table. Thus, for example, when provided with a complimentary drinking cup, the passenger is forced to choose between manually holding the cup for the duration of its use or placing the tray table in the deployed position to hold the cup. Deploying the fold down tray table, which requires significant space, to hold only a single drinking cup represents an inefficient use of space in an environment where space is at a premium.

In addition, during certain periods of time spent in mass transportation vehicles, for example takeoff and landing of an airplane, the passenger is required to have the fold down tray table in the upright and locked position. Therefore, during such time periods the passenger is prevented from using the fold down tray table even if they wish to do so. For a passenger who wishes to use a portable electronic device or other object (e.g., watch a movie on a tablet computing device) the passenger is again faced with the undesirable choice of manually holding the device or delaying use of the device until after takeoff.

A holder apparatus for detachable coupling to fold down tray tables of seats may be summarized as including: a platform having a primary aperture sized to supportingly receive a drinking cup partially extending therethrough; a supporting hook having an opening sized and shaped to receive an edge of a fold down tray table therein, the supporting hook which at least in use is physically coupled to the platform to support the platform from the fold down tray table while the fold down tray table is in an upright configuration; a device retention hook sized and shaped to receive an edge of a portable electronic device; and a bias member that physically couples the device retention hook to at least one of the platform or the supporting hook and which biases the device retention hook toward the platform when the portable electronic device is positioned between the device retention hook and at least one of the platform or the supporting hook.

The platform may have a rectangular top plan view profile and the primary aperture may be circular and extend completely through the platform from a top through a bottom thereof. The platform may have a secondary aperture sized and dimensioned to supportingly receive a writing implement at least partially extending therethrough. The supporting hook may be integral to the platform. The supporting hook may be selectively removably coupleable to the platform via at least one pair of complementary mating structures. The platform may include at least one flexure portion between an outer edge of the platform and a respective complementary mating structure of the platform. The platform may include at least one tab and the supporting hook may include at least one slot sized and dimensioned to removably physically secure the supporting hook to the platform. The tab of the platform may have a T-shaped profile and the at least one slot of the supporting hook may be sized and dimensioned to removably receive the tab of the platform. The supporting hook may have a U-shaped profile with a first leg of the U-shaped profile longer than a second leg of the U-shaped profile, the longer leg positionable relatively behind the fold down tray table while the fold down tray table is in the upright configuration. The device retention hook may have three legs, a front pair of legs positioned parallel to one another to engage a front portion of the portable electronic device in use, and a rear one of the legs positioned to engage a rear portion of the portable electronic device in use. The bias member may include an elastic member having a first end physically coupled to the supporting hook and a second end physically coupled to the device retention hook.

The holder apparatus may further include: a cord lock physically coupled to the elastic member, a position of the cord lock relative to the elastic member adjustable to adjust a second position at which the device retention hook is maintained relative to the elastic member. The platform may have at least one lip extending from a top of the platform. The device retention hook may be sized and shaped to receive a first edge of the portable electronic device, and the platform may include a groove sized and shaped to receive a second edge of the portable electronic device, the second edge of the portable electronic device opposite the first edge of the portable electronic device.

The platform and the supporting hook may be a one piece unitary hooked platform structure. The hooked platform structure may have an intermediate portion located between the platform and the supporting hook, the intermediate portion having a groove formed in an upper surface thereof, the upper surface of the intermediate portion located relatively above a top of the platform.

The platform may further include a drinking vessel retention arm that extends from a bottom of the platform, at least a portion of the drinking vessel retention arm located relatively directly below the primary aperture.

The holder apparatus may further include a clamp structure physically coupled to at least one of the platform and the supporting hook, the clamp structure operable at least in use to clamp the edge of a fold down tray table in the opening of the supporting hook.

At least in use the supporting hook may be selectively pivotably coupled to the platform.

The holder apparatus may further include a fastener that at least in use extends through a first cylindrical coupling structure of a first one of the supporting hook or the platform to reach and extend into at least a portion of a second cylindrical coupling structure of a second one of the supporting hook or the platform, the first and the second cylindrical coupling structures selectively rotatably movable relative to each other when the fastener is not substantially tightened and physically secured relative to each other when the fastener is substantially tightened.

A holder apparatus for detachable coupling to fold down tray tables of seats may be summarized as including: a platform having a primary aperture sized to supportingly receive a drinking cup partially extending therethrough; and a supporting hook having an opening sized and shaped to receive an edge of a fold down tray table therein, the supporting hook which at least in use is physically coupled to the platform to support the platform from the fold down tray table while the fold down tray table is in an upright configuration.

A holder apparatus for detachable coupling to fold down tray tables of seats may be summarized as including: a supporting hook having an opening sized and shaped to receive an edge of a fold down tray table therein, the supporting hook including a platform portion to support a first edge of a portable electronic device; a device retention hook sized and shaped to receive a second edge of the portable electronic device that is opposite the first edge; and a bias member that physically couples the device retention hook to the supporting hook and which biases the device retention hook toward the platform portion when the portable electronic device is positioned between the device retention hook and the platform portion of the supporting hook.

A holder apparatus for detachable coupling to fold down tray tables of seats may be summarized as including: a platform having a primary aperture sized to supportingly receive a drinking cup partially extending therethrough; a supporting hook having an opening sized and shaped to receive an edge of a fold down tray table therein, the supporting hook which at least in use is physically coupled to the platform to support the platform from the fold down tray table while the fold down tray table is in an upright configuration; a device retention hook sized and shaped to receive an edge of a portable object; and a bias member that physically couples the device retention hook to at least one of the platform or the supporting hook and which biases the device retention hook toward the platform when the portable object is positioned between the device retention hook and at least one of the platform or the supporting hook.

BRIEF DESCRIPTION OF THE SEVERAL VIEWS OF THE DRAWINGS

In the drawings, identical reference numbers identify similar elements or acts.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

Figure 1:
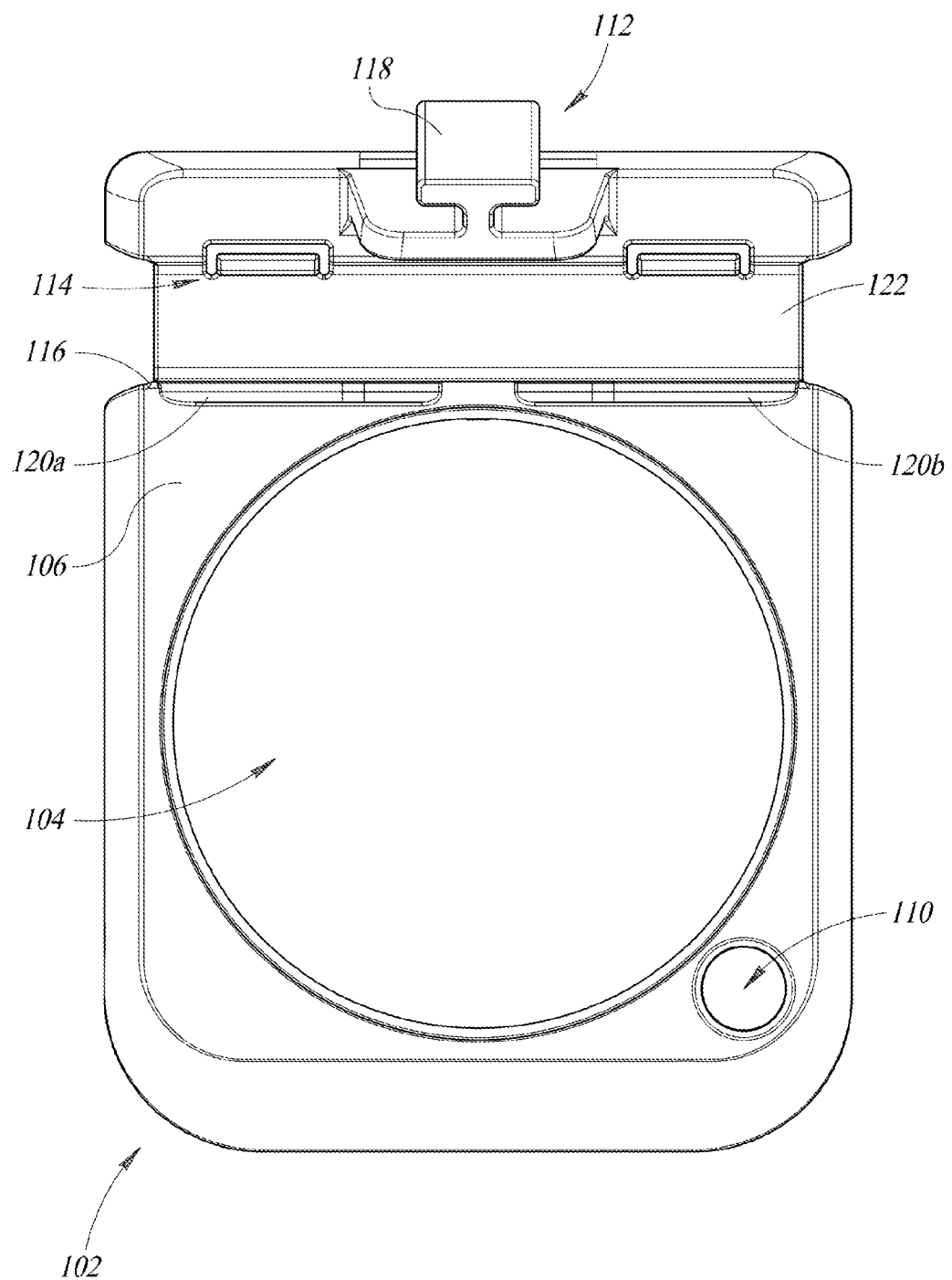
FIG. 1 is a top plan view of a platform of a holder apparatus, according to at least one illustrated embodiment.
Figure 2:
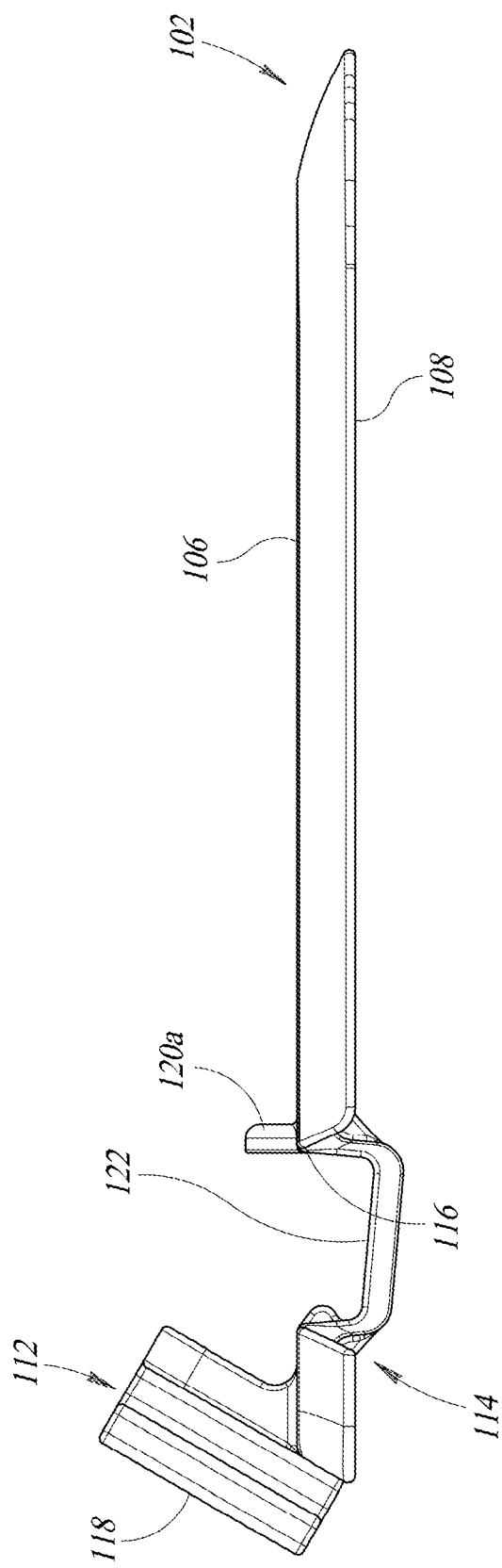
FIG. 2 is side elevation view of the platform of FIG. 1, according to at least one illustrated embodiment.
Figure 3:
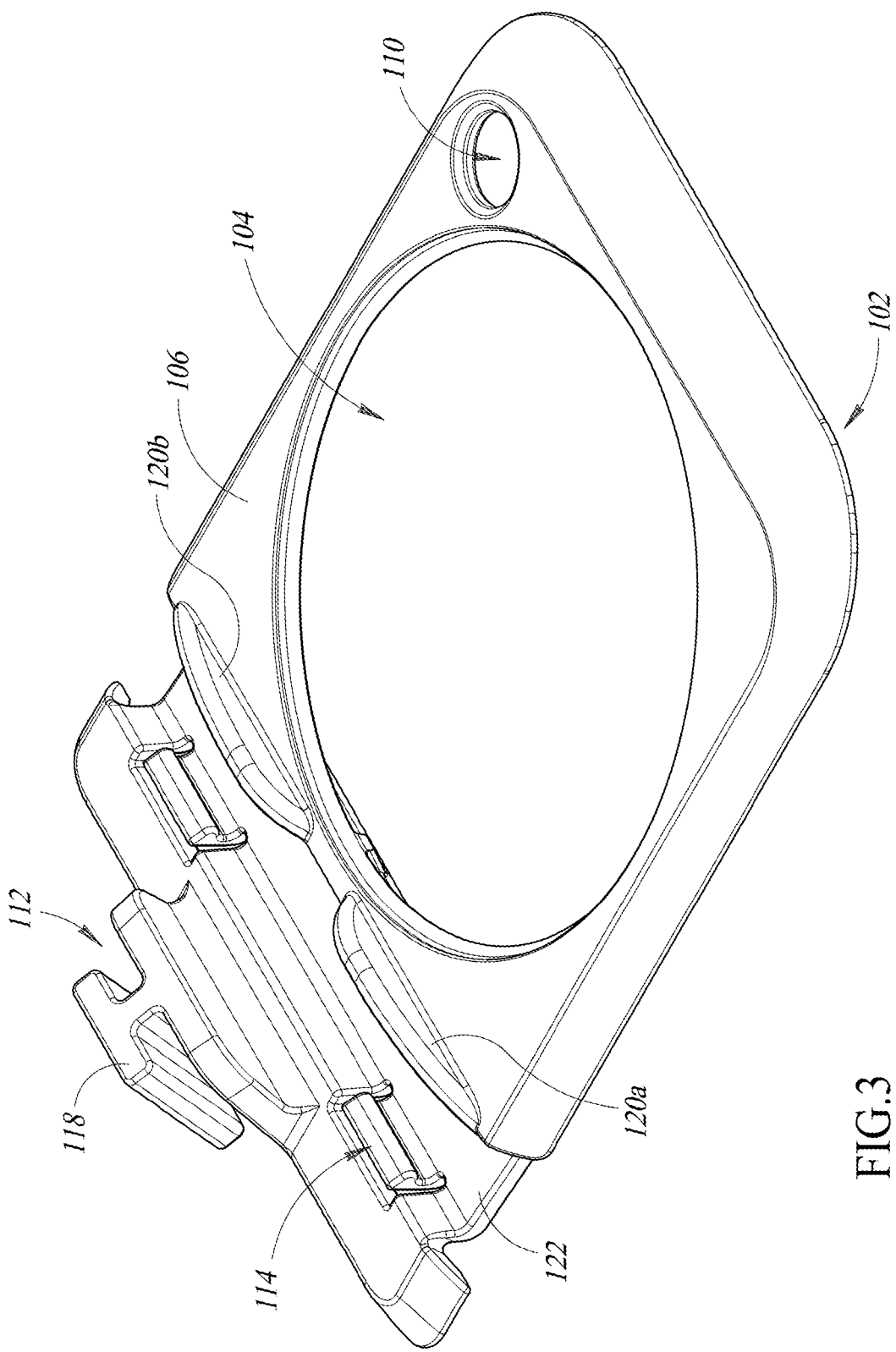
FIG. 3 is an isometric view of the platform of FIG. 1, according to at least one illustrated embodiment.

FIGS. 1-3 show an example platform 102 of a holder apparatus, according to one illustrated embodiment. In particular, FIG. 1 is a top plan view of the platform 102; FIG. 2 is a side elevation view of the platform 102; and FIG. 3 is an isometric view of the platform 102.

The platform 102 has a primary aperture 104 that is sized to supportingly receive a drinking cup or other object extending partially therethrough. The primary aperture 104 may be circular, as shown. The primary aperture 104 extends completely through the platform 102 from a top 106 of the platform 102 to a bottom 108 of the platform 102. A diameter of the primary aperture 104 may be designed to accommodate and supportingly receive various drinking cups of standardized sizes used by providers of mass transportation travel, such as airline travel.

Figure 20A:
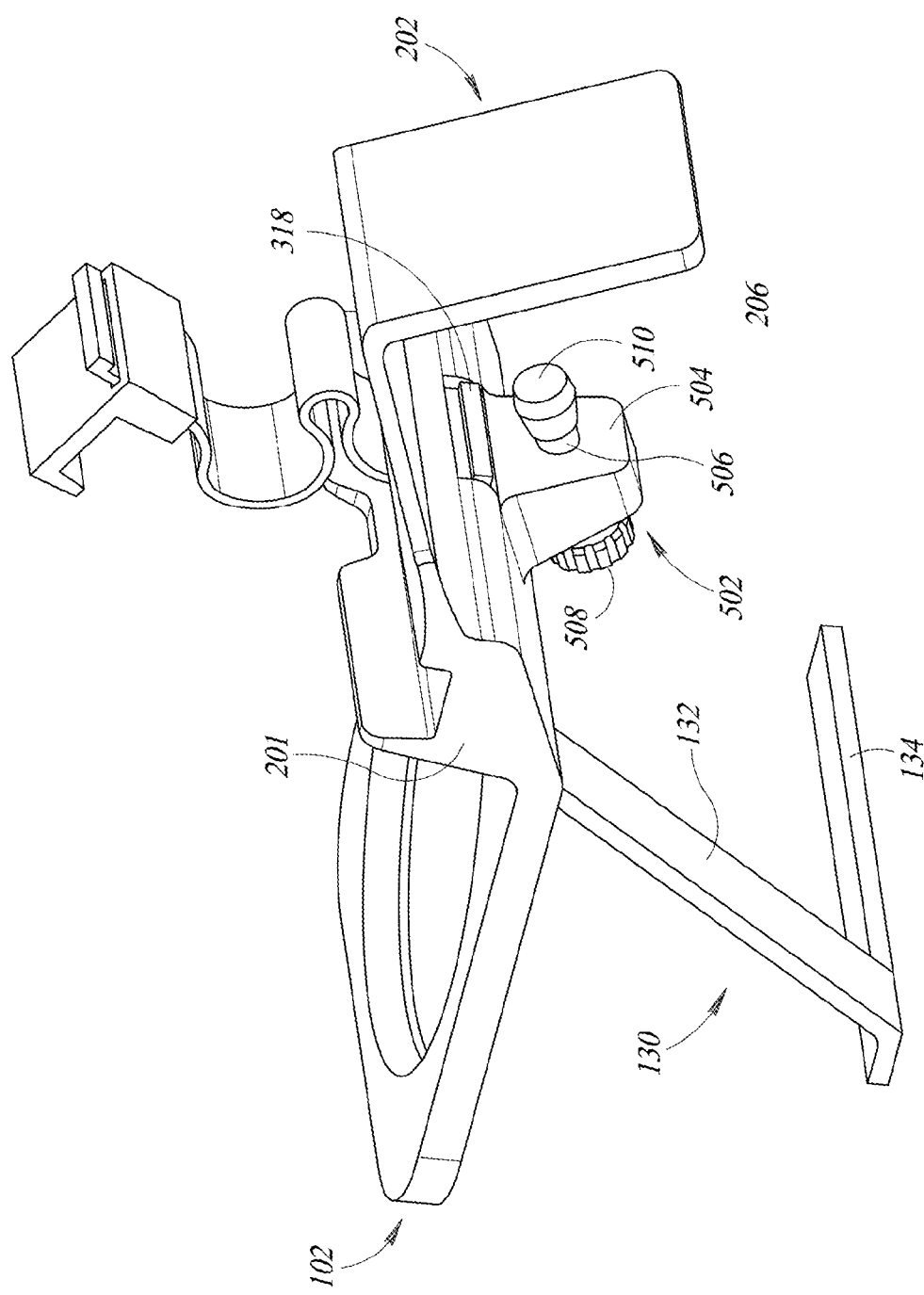
FIG. 20A is an isometric view of a holder apparatus that includes a drinking vessel retention arm and a clamp structure, according to at least one illustrated embodiment.
Figure 20B:
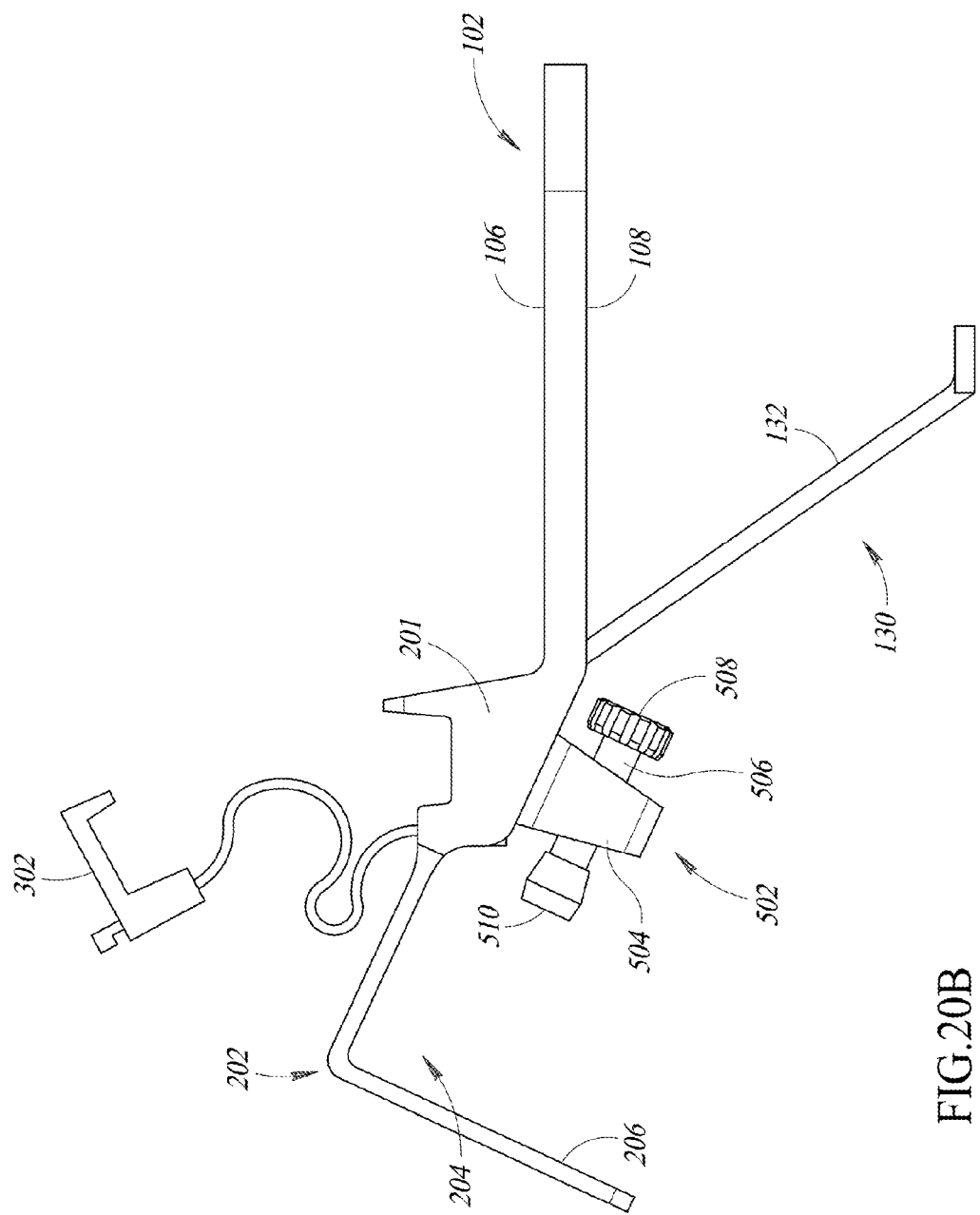
FIG. 20B is a side elevational view of the holder apparatus of FIG. 20A.

In some implementations, the platform 102 can further include a drinking vessel retention arm. As an example, as illustrated in FIGS. 20A and 20B, the platform 102 includes a drinking vessel retention arm 130 that extends from a bottom 108 of the platform 102. At least a portion of the drinking vessel retention arm 130 is located relatively directly below the primary aperture 104 to retain a drinking cup or other drinking vessel (e.g., soda or beer can) that extends through the primary aperture 104.

In various implementations, the drinking vessel retention arm 130 is selectively foldable, retractable, and/or collapsible. In some implementations, the drinking vessel retention arm 130 can be a telescoping arm. In some implementations, the drinking vessel retention arm 130 can selectively clip into or otherwise be selectively securable to the bottom 108 of the platform 102.

As illustrated in FIGS. 20A and 20B, the drinking vessel retention arm 130 includes a first arm portion 132 that extends away from the bottom 108 of the platform 102 and a second arm portion 134 that extends from the first arm portion 132 to reside at least in part directly below the first aperture 104. The first arm portion 132 can extend away from the bottom 108 of the platform 102 at an angle, as illustrated, or can directly extend away from the bottom 108 of the platform 102. In some implementations, the drinking vessel retention arm 130 can include a third arm portion (not shown) that extends from a second end of the second arm portion 134 to the bottom 108 of the platform 102, where the second end of the second arm portion 134 is opposite a first end at which the second arm portion 134 couples to the first arm portion 132.

Inclusion of the drinking vessel retention arm 130 in the holder apparatus may allow the platform to hold non-tapered drinking vessel such as a can or to hold a drinking vessel that may or may not be tapered but that is of insufficient diameter to be held by the perimeter of the primary aperture alone.

Referring again to FIGS. 1-3, the platform 102 may also have a secondary aperture 110. The secondary aperture 110 is sized and dimensioned to supportingly receive a writing implement or other object at least partially extending therethrough. For example, the writing implement may be a pen, a pencil, a stylus, or other elongated object.

The platform 102 includes a first complementary mating structure 112. The first complementary mating structure 112 is complementary to and mates with a second complementary mating structure 212 of a supporting hook 202, as will be discussed further with reference to FIGS. 4-6. In particular, the first and the second complementary mating structures 112 and 212 enable selective and removable coupling between the platform 102 and the supporting hook 202.

The first complementary mating structure 112 may include at least one tab 118. In some implementations, as shown in FIG. 1-3, the at least one tab 118 has a T-shaped profile. However, the tab 118 may have other profile shapes, including, for example, a jigsaw shape or other shapes amenable to secure complementary mating.

As best shown in FIGS. 2 and 3, a longitudinal axis of the tab 118 may be offset from normal to the platform 102 by an offset angle. The magnitude of such offset angle may be designed or selected based on an average or standard degree from vertical at which seatbacks of mass transportation seats recline.

The platform 102 may include a groove 122 that is sized and shaped to receive an edge of an object to be held. For example, the groove 122 may be sized and shaped to receive the edge of a book, a portable electronic device, a file, a folder, or other object. As used herein, the term "portable electronic device" includes smartphones, tablet computing devices, electronic reading devices, display screens, gaming devices, portable media storage and/or playback devices, personal digital assistants, portable medical devices (e.g., glucose, heartbeat, blood pressure monitors), and other devices. The groove 122 may be sized and shaped to accommodate an edge of any object.

Alternatively to or in addition to the groove 122, the platform 102 may include at least one lip, ridge, or other protrusion that extends from the top 106 of the platform 102. In some implementations, as shown in FIGS. 1-3, a pair of lips 120a and 120b (collectively 120) may extend from the top 106 of the platform 102. The lips 120 may serve to hold an edge of an object (e.g., portable electronic device) in place or otherwise prevent such edge from sliding forwards towards the primary aperture 104. In some implementations, the at least one lip 120 is an extension of or otherwise forms a portion of a sidewall of the groove 122.

Figure 19A:
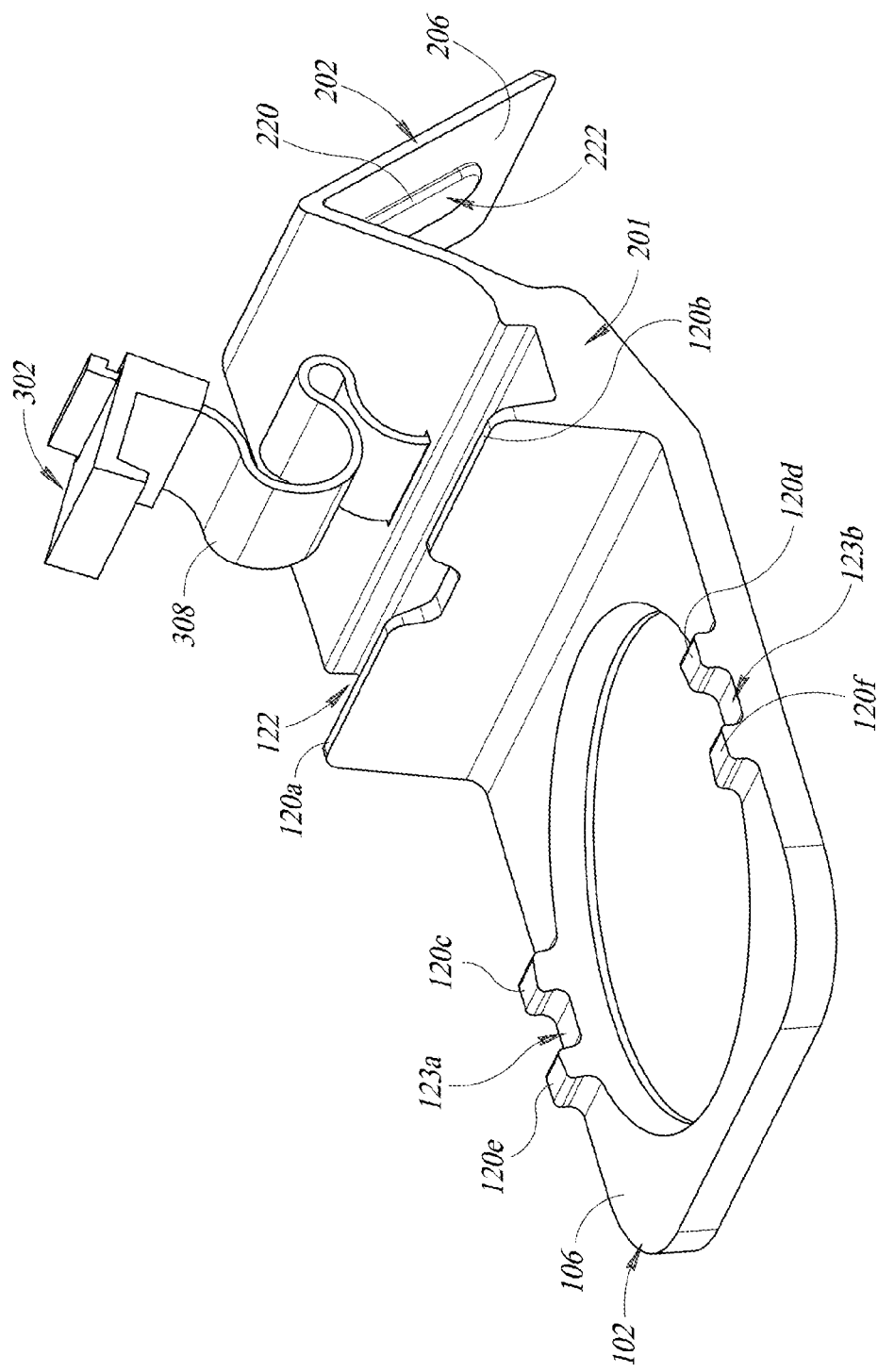
FIG. 19A is an isometric view of a holder apparatus that includes multiple sets of lips or ridges to respectively provide multiple angles at which the holder apparatus holds an object, according to at least one illustrated embodiment.
Figure 19B:
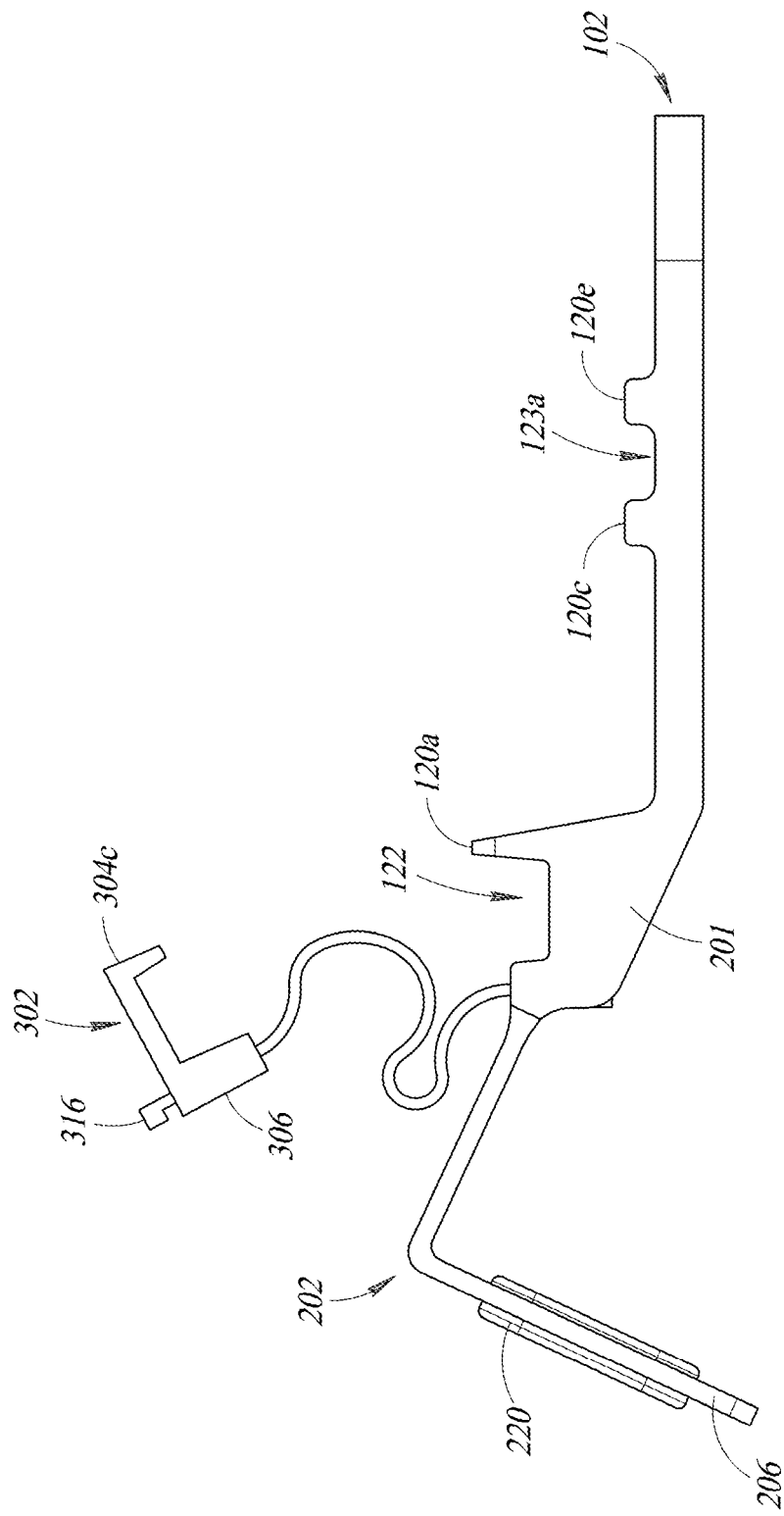
FIG. 19B is a side elevational view of the holder apparatus of FIG. 19A.

In some implementations, the platform 102 can include multiple sets of lips to respectively provide multiple angles at which the holder apparatus can selectively hold an object such as a portable electronic device. As an example, as illustrated in FIGS. 19A and 19B, in addition to the pair of lips 120a and 120b, a second pair of lips 120c and 120d and a third pair of lips 120e and 120f can extend or otherwise protrude from the top 106 of the platform 102. A second groove 123 is formed between the second pair of lips 120c and 120d and the third pair of lips 120e and 120f. The second groove 123 is illustrated as having a pair of second groove portions 123a and 123b. Such multiple sets of lips allow a user to select a particular viewing angle that provides the best line of sight to an object held by the apparatus.

In some implementations, as illustrated in FIGS. 19A and 19B, a grommet 220 may be fitted into an aperture 222 formed in the leg 206 of the supporting hook 202. The grommet 220 can be polymer, rubber, or other gripping materials. The grommet 220 may assist the leg 206 of the supporting hook 202 in gripping to or otherwise remaining secured relative to the tray table.

Referring again to FIGS. 1-3, the platform 102 may include at least one flexure portion 114 between an outer edge 116 of the platform 102 and the complementary mating structure 112. The flexure portion 114 is resiliently and flexibly movable within a range of flexion. The flexure portion 114 may assist in securely holding an object, such as a portable electronic device, in the groove 122 or other portion of the platform 102. For example, the edge of the portable electronic device may slightly displace the flexure portion 114 when received in the groove 122. The displaced flexure portion 114 may apply pressure to the edge of the portable electronic device to securely hold the device in the groove 122.

In some implementations, the platform 102 does not include any flexure portion 114. For example, the groove 122 may have substantially continuous sidewalls that do not feature flexure portions 114.

The platform 102 may be plastic (e.g., reinforced plastic), metal, or other materials. In some implementations, the platform 102 is a single piece of molded plastic. In some implementations, a three-dimensional printing procedure or apparatus creates the platform 102.

Figure 4:
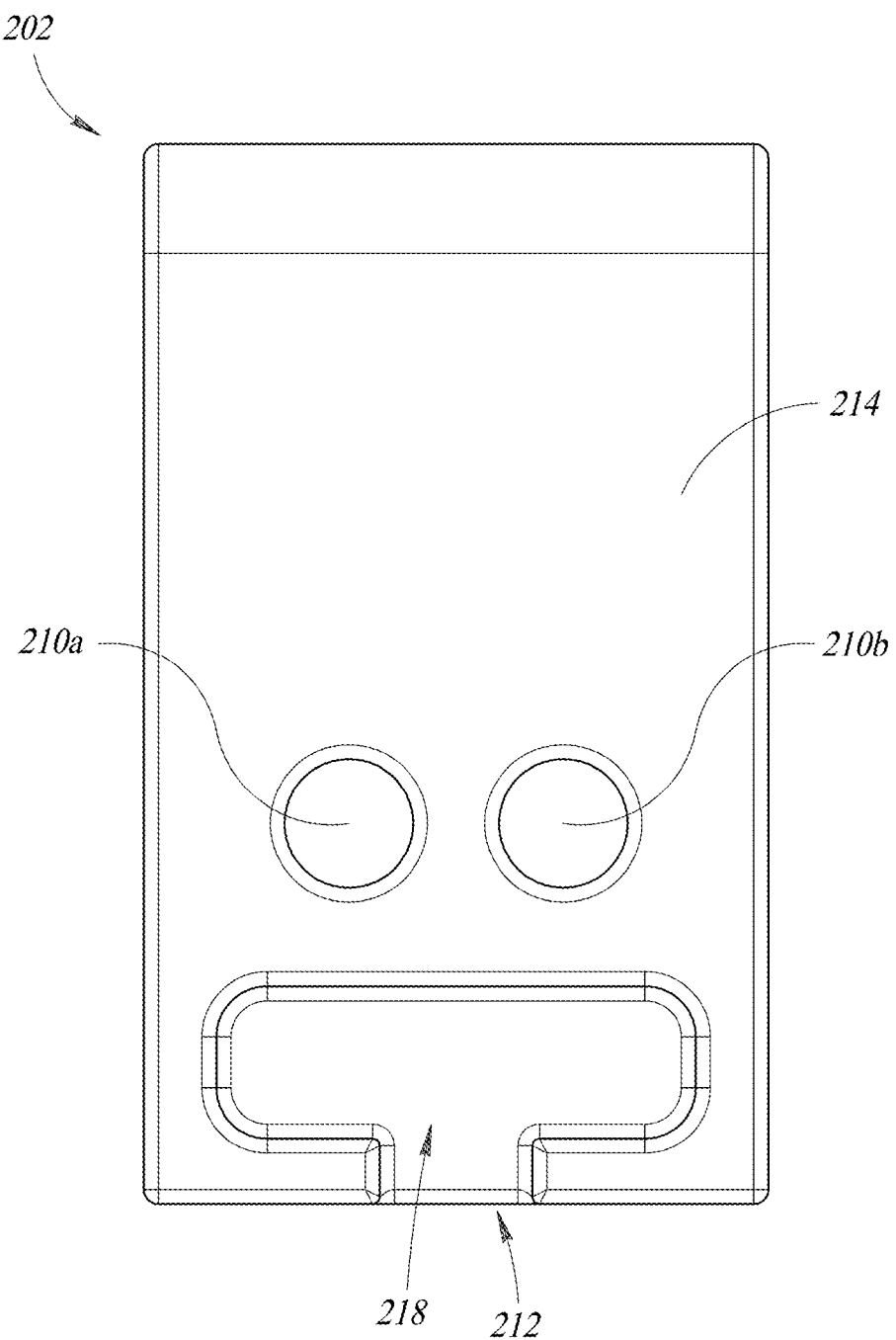
FIG. 4 is a top plan view of a supporting hook of a holder apparatus, according to at least one illustrated embodiment.
Figure 5:
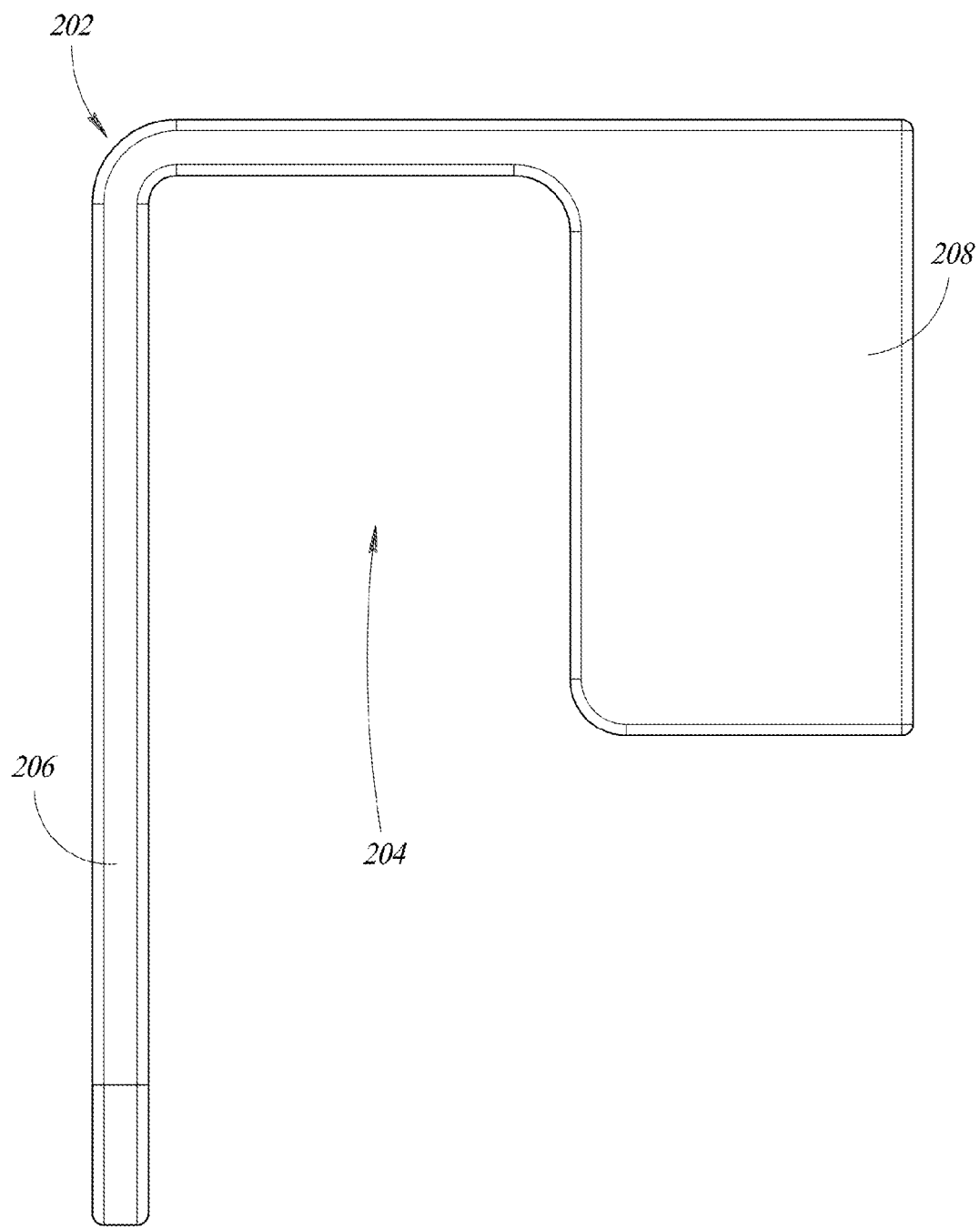
FIG. 5 is a side elevation view of the supporting hook of FIG. 4, according to at least one illustrated embodiment.
Figure 6:
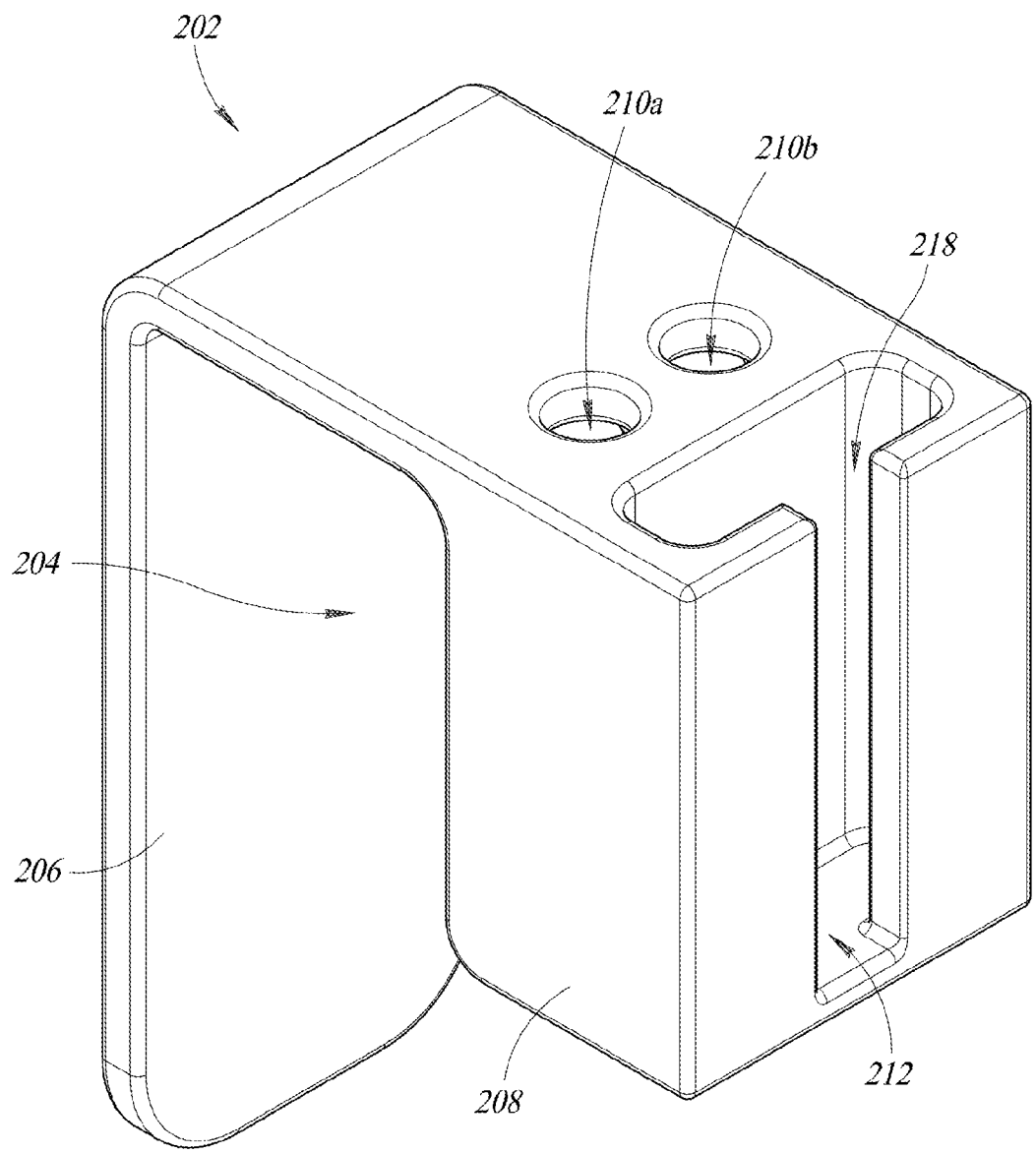
FIG. 6 is an isometric view of the supporting hook of FIG. 4, according to at least one illustrated embodiment.

FIGS. 4-6 show an example supporting hook 202 of a holder apparatus, according to at least one illustrated embodiment. In particular, FIG. 4 is a top plan view of the supporting hook 202, FIG. 5 is a side elevational view of the supporting hook 202, and FIG. 6 is an isometric view of the supporting hook 202.

As best shown in FIGS. 5 and 6, the supporting hook 202 has an opening 204 sized and shaped to receive an edge of a fold down tray table therein. For example, the supporting hook 202 may have a U-shaped profile with a first leg 208 and a second leg 206. The second leg 206 may be longer than the first leg 208. The second leg 206 is positionable relatively behind the fold down tray table while the fold down tray table is in the upright configuration.

When the holder apparatus is in use, the supporting hook 202 is physically coupled to the platform 102 to support the platform 102 from the fold down tray table. As one example, in some implementations, the supporting hook 202 is integral to the platform 102.

As another example, the supporting hook 202 may have a second complementary mating structure 212 that is complementary to and mates with the first complementary mating structure 112 of the platform 102. In particular, in some implementations, the second complementary mating structure 212 includes at least one slot 218 sized and dimensioned to removably physically secure the supporting hook 202 to the platform 102. For example, the at least one slot 218 may be sized and dimensioned to respectively removably receive the at least one tab 118 of the platform 102.

The supporting hook 202 may include one or more passageways 210 through which a bias member extends and is physically coupled to the supporting hook 202. For example, as best shown in FIGS. 4 and 6, the supporting hook 202 has a pair of passageways 210a and 210b. A bias member may extend through the passageways 210a and 210b to physically couple the bias member to the supporting hook, as will be discussed further with reference to FIG. 11.

In some implementations, the supporting hook 202 may itself include a platform portion. For example, the supporting hook 202 may have a groove and/or one or more lips to securingly receive and support an object such as a portable electronic device.

The supporting hook 202 may be plastic (e.g., reinforced plastic), metal, or other materials. In some implementations, the supporting hook 202 is a single piece of molded plastic. In some implementations, a three-dimensional printing procedure or apparatus creates the supporting hook 202.

In further implementations, the platform 102 and the supporting hook 202 may be portions of a one piece unitary hooked platform structure. As example, FIGS. 18A-C, 19A-B, and 20A-B show a holder apparatus in which the platform 102 and the supporting hook 202 are integrally connected as portions of a one piece unitary hooked platform structure.

The one piece unitary hooked platform structure may be plastic (e.g., reinforced plastic), metal, or other materials. In some implementations, the one piece unitary hooked platform structure is a single piece of molded plastic. In some implementations, a three-dimensional printing procedure or apparatus creates the one piece unitary hooked platform structure.

Figure 18A:
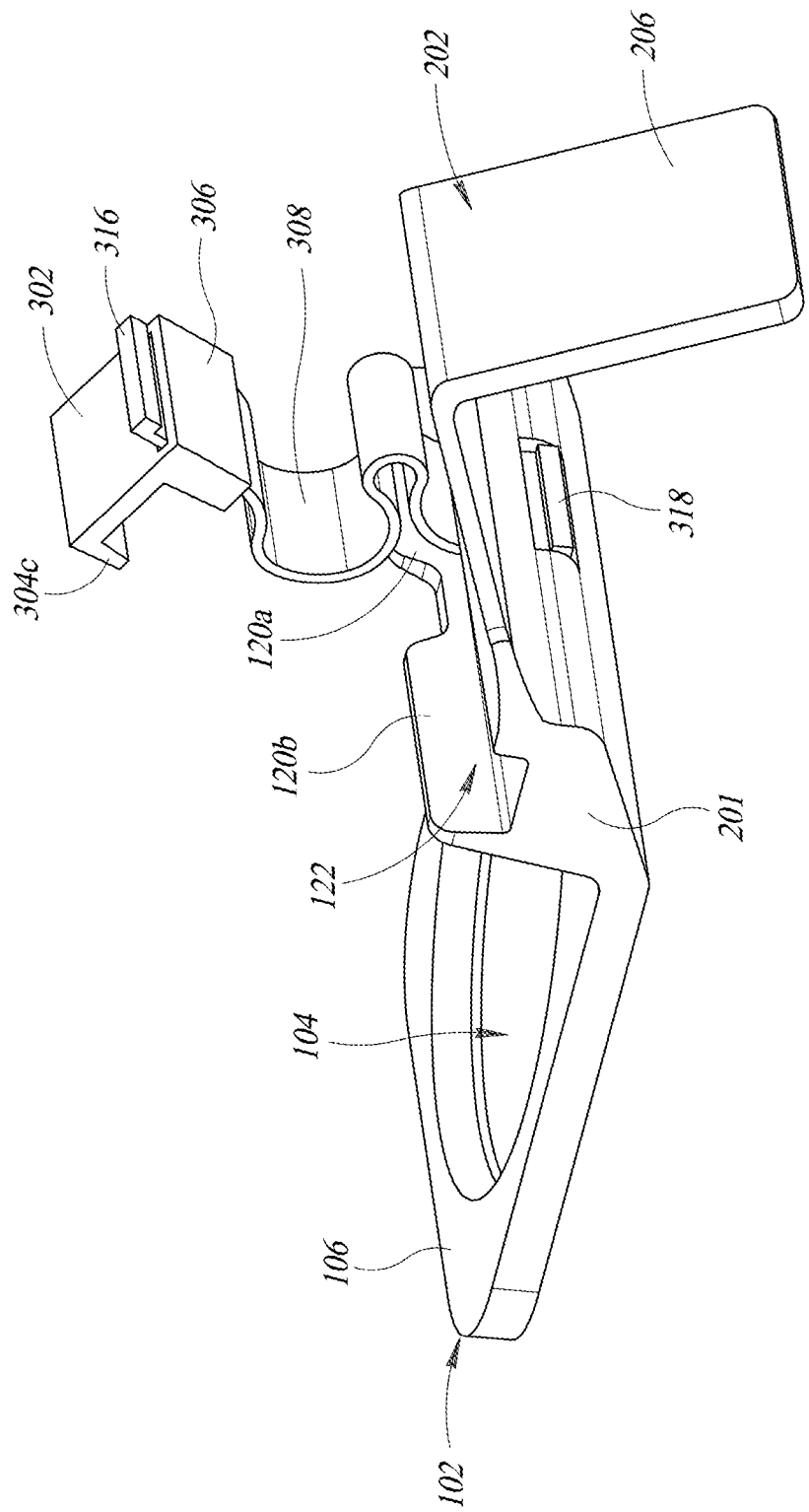
FIGS. 18A and 18B are isometric views of a holder apparatus that includes one piece unitary hooked platform structure, according to at least one illustrated embodiment.
Figure 18B:
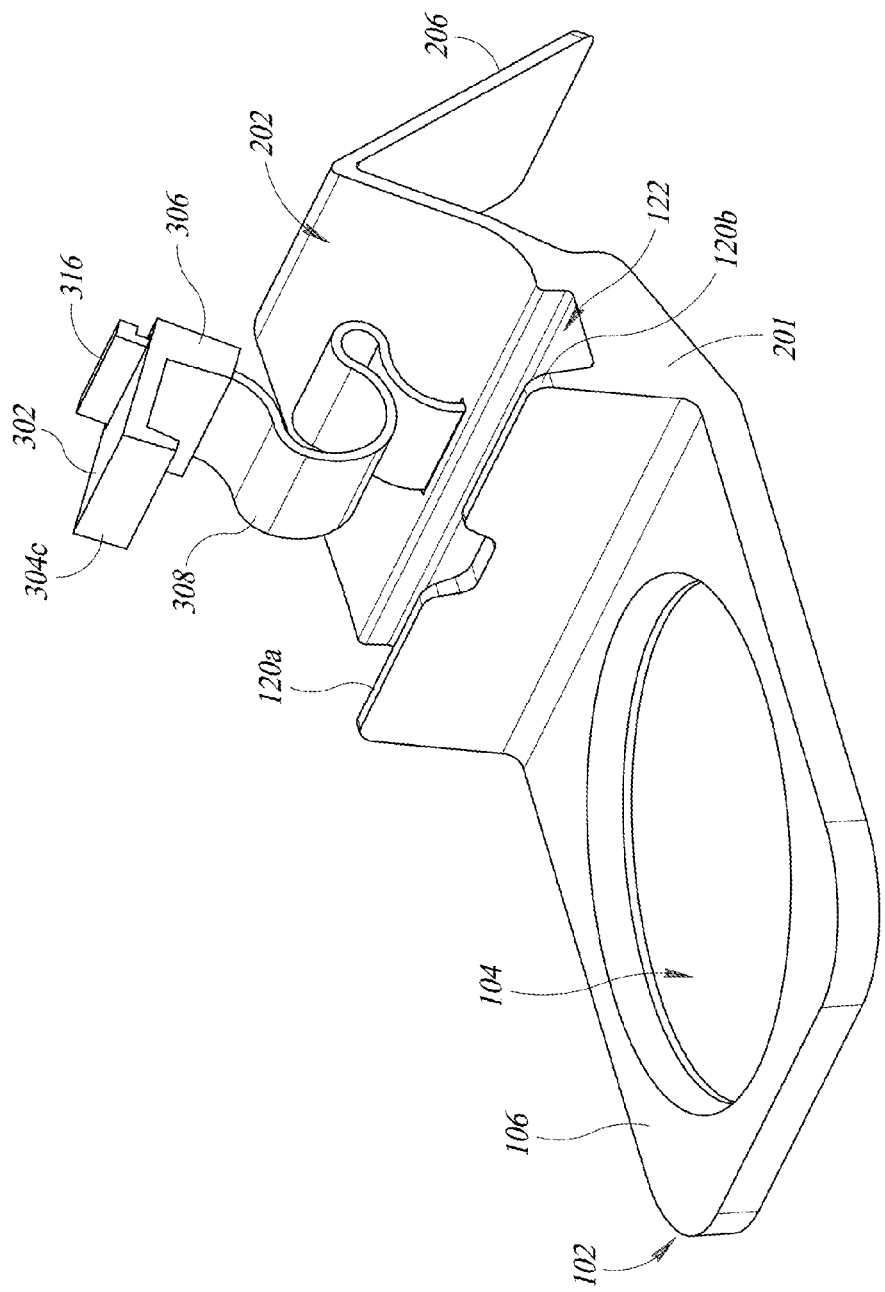
Figure 18C:
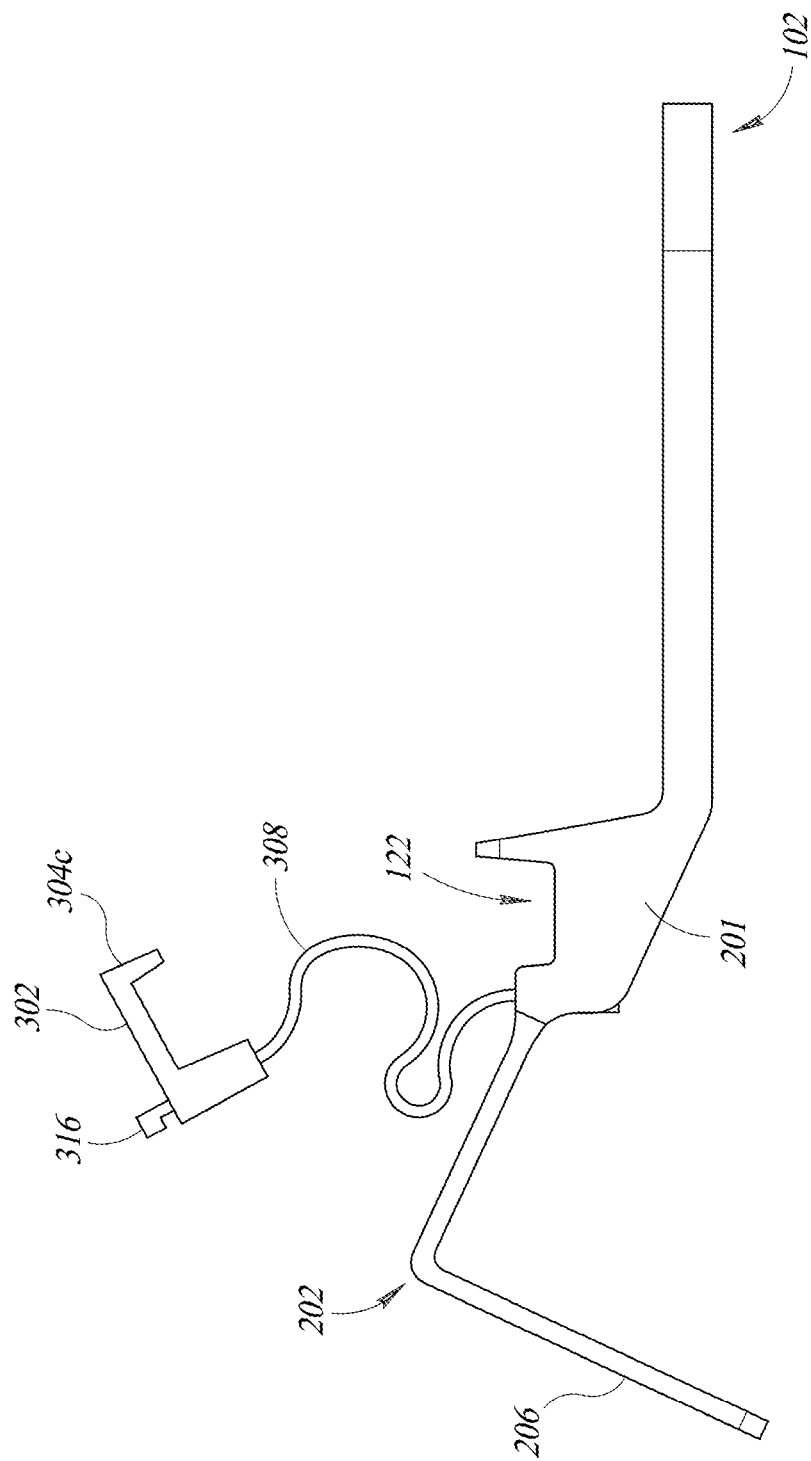
FIG. 18C is a side elevational view of the holder apparatus of FIGS. 18A and 18B.

With particular reference to FIGS. 18A-C, the one piece unitary hooked platform structure can include an intermediate portion 201. The intermediate portion 201 can be located between the platform 102 and the supporting hook 202 of the one piece structure. In some implementations, as illustrated, the intermediate portion 201 can have a substantially triangular cross section that tapers upward from the platform 102 to meet the supporting hook 202. In some implementations, the intermediate portion 201 can be considered as a portion of the platform 102.

As illustrated best in FIG. 18C, the intermediate portion 201 can have a groove 122 formed in an upper surface thereof. In some implementations, the upper surface of the intermediate portion 201 (and correspondingly the groove 122) is located relatively above a top 106 of the platform 102 such that a drinking cup held by primary aperture 104 does not interfere with a line of sight to an object held in groove 122.

Figure 21A:
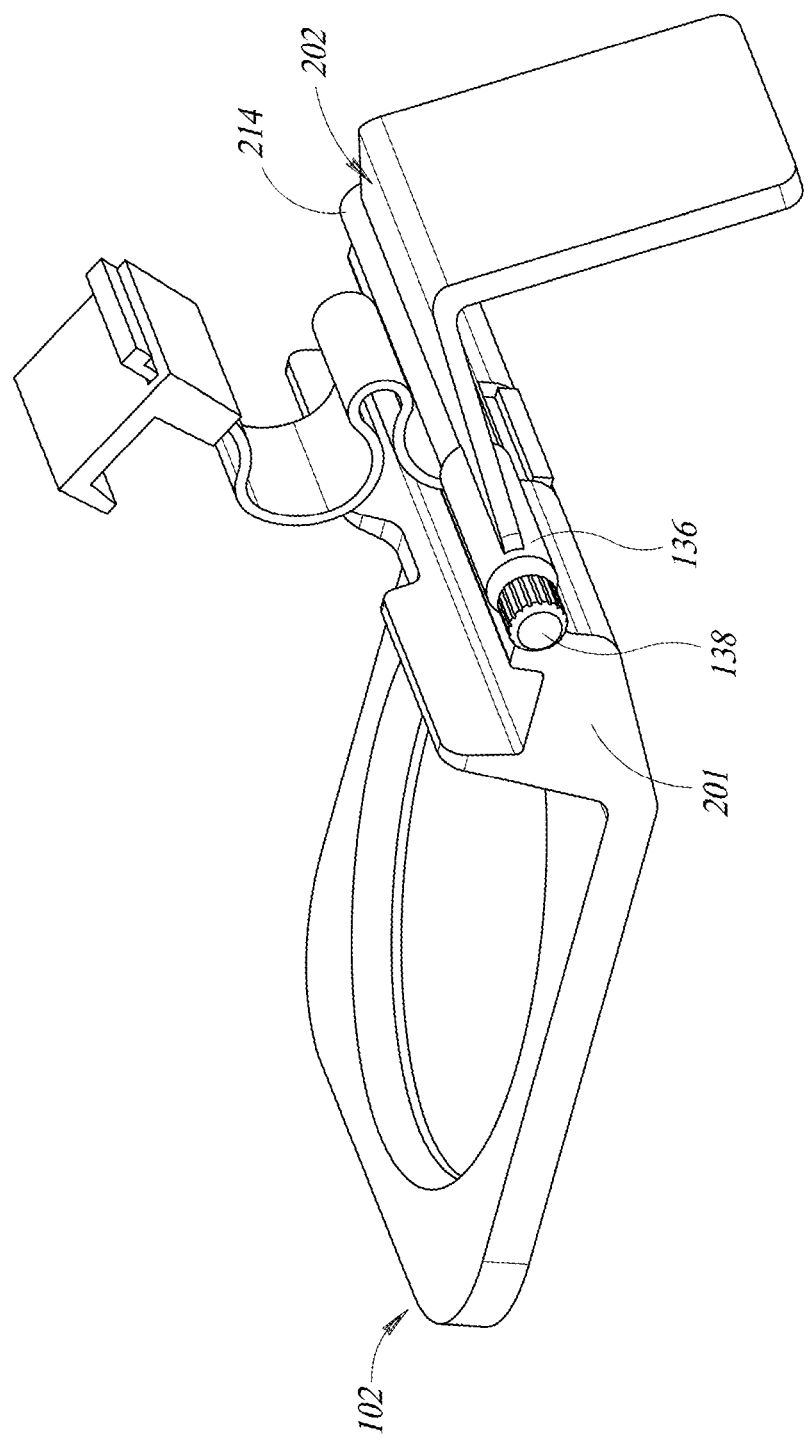
FIGS. 21A and 21B are isometric views of a holder apparatus that includes a platform and a supporting hook that are selectively pivotably movable relative to each other, according to at least one illustrated embodiment.
Figure 21B:
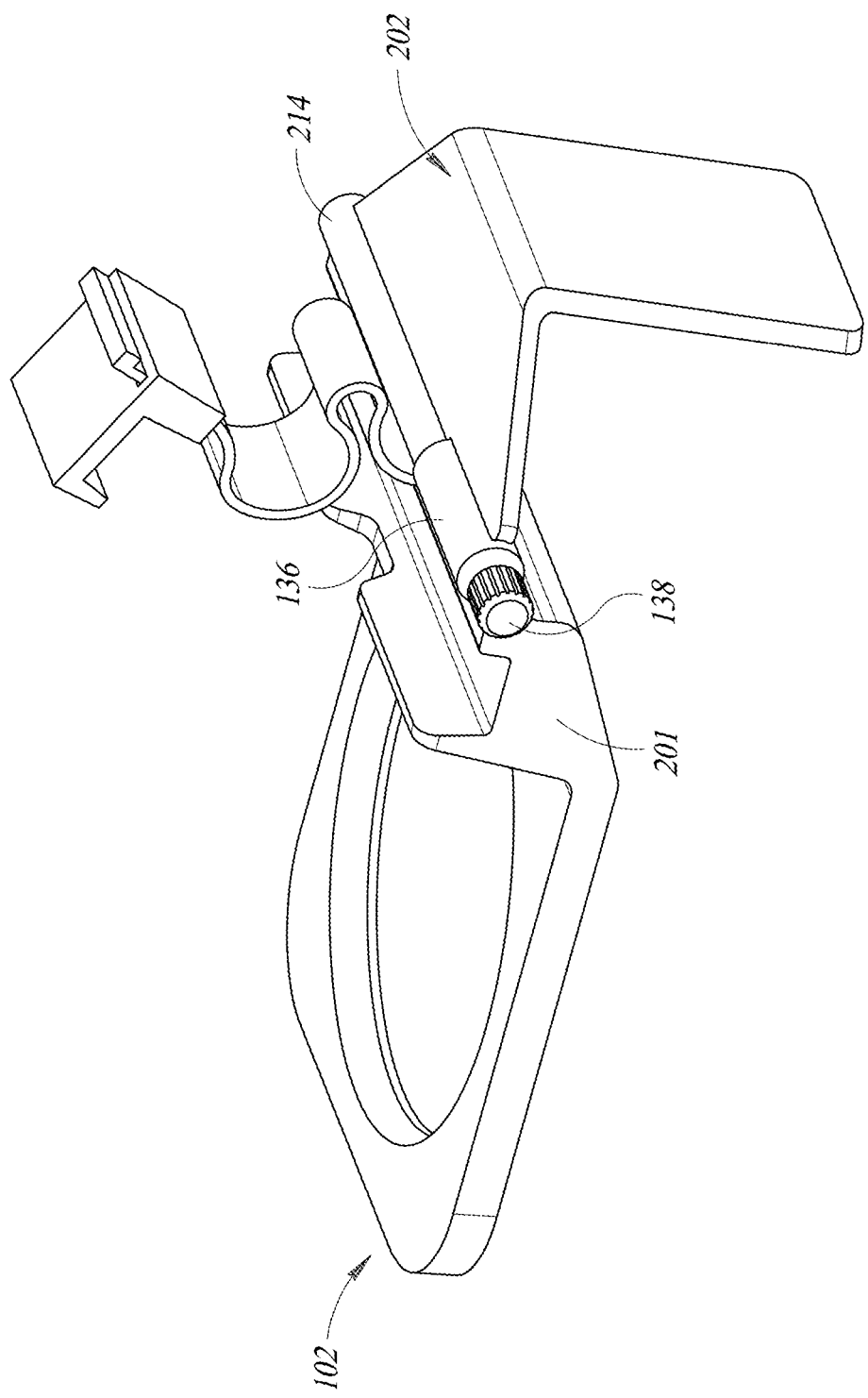

In yet further implementations, the platform 102 and the supporting hook 202 may be selectively pivotably coupled to each other. For example, as illustrated in FIGS. 21A and 21B, a first cylindrical coupling structure 136 can be physically coupled to or integral to the intermediate portion 201 or other portions of the platform 102. A second cylindrical coupling structure 214 can be physically coupled to or integral to the supporting hook 202. In some implementations, at least a portion of the second cylindrical coupling structure 214 is coaxially insertable into at least a portion of the first cylindrical coupling structure 136. In some implementations, the second cylindrical coupling structure 214 is physically coupled to the platform 102 while the first cylindrical coupling structure 136 is physically coupled to the supporting hook 202.

A fastener 138 at least in use extends through the first cylindrical coupling structure 136 to reach and extend into at least a portion of a second cylindrical coupling structure 214. The first cylindrical coupling structure 136 and the second cylindrical coupling structure 214 are selectively rotatably movable relative to each other and about the fastener 138 when the fastener 138 is not substantially tightened. The first cylindrical coupling structure 136 and the second cylindrical coupling structure 214 are physically secured relative to each other when the fastener 138 is substantially tightened. The fastener 138 and one or both of the first cylindrical coupling structure 136 and the second cylindrical coupling structure 214 can have complementary threaded structures.

Through the inclusion of the cylindrical coupling structures the orientation of the platform 102 relative to the supporting hook 202 can be adjusted. Such may be advantageous, for example, when the airline seat is reclined or otherwise changes positions. Through selective adjustment of the relative orientations, the platform 102 can be maintained at a desired orientation (e.g., substantially horizontal) regardless of the angle at which the seat in front of the user is reclined. The selective adjustment of the relative orientations may advantageously permit storage of the holder apparatus in a configuration in which the supporting hook 202 is fully folded inward.

Figure 7:
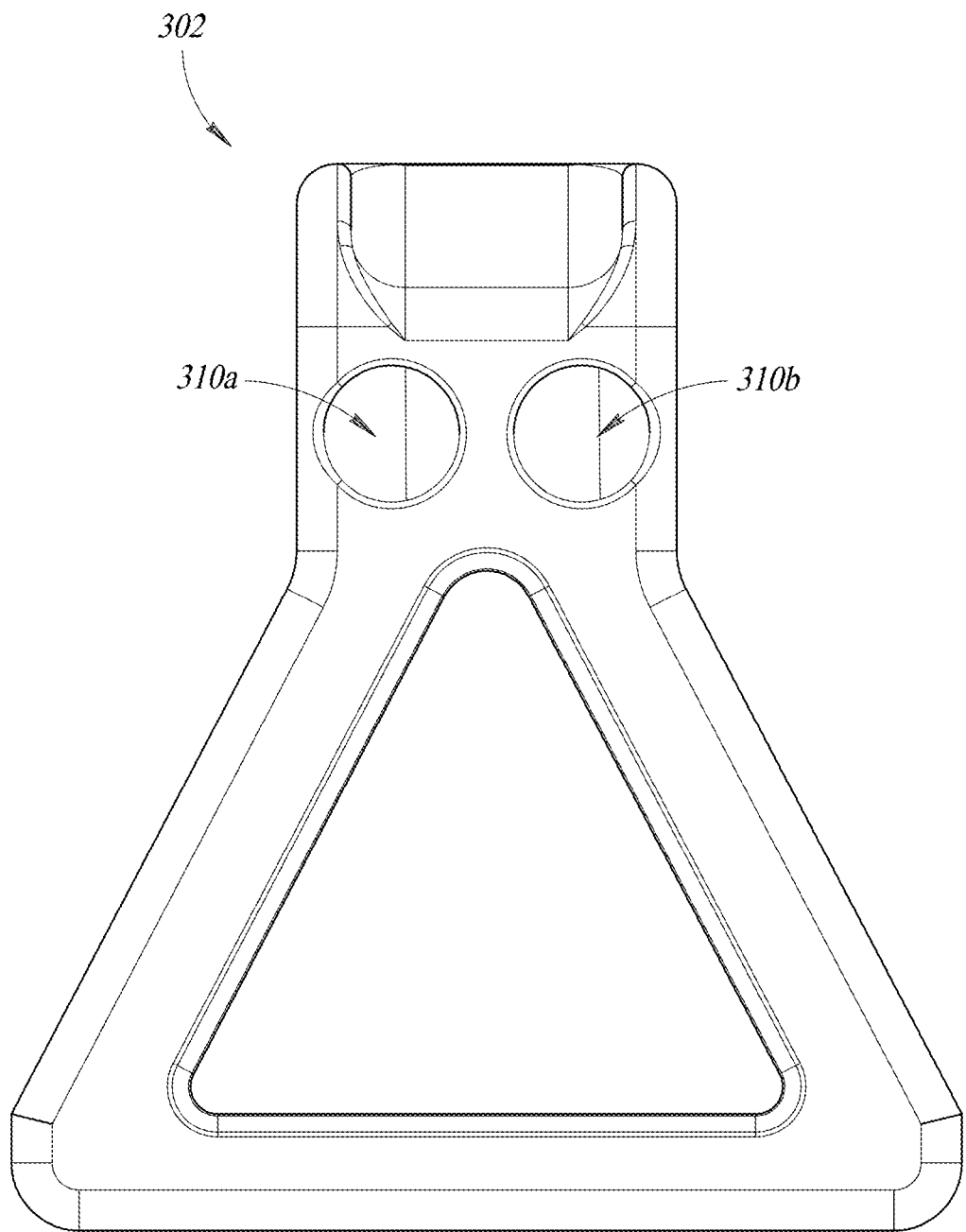
FIG. 7 is a top plan view of a device retention hook of a holder apparatus, according to at least one illustrated embodiment.
Figure 8:
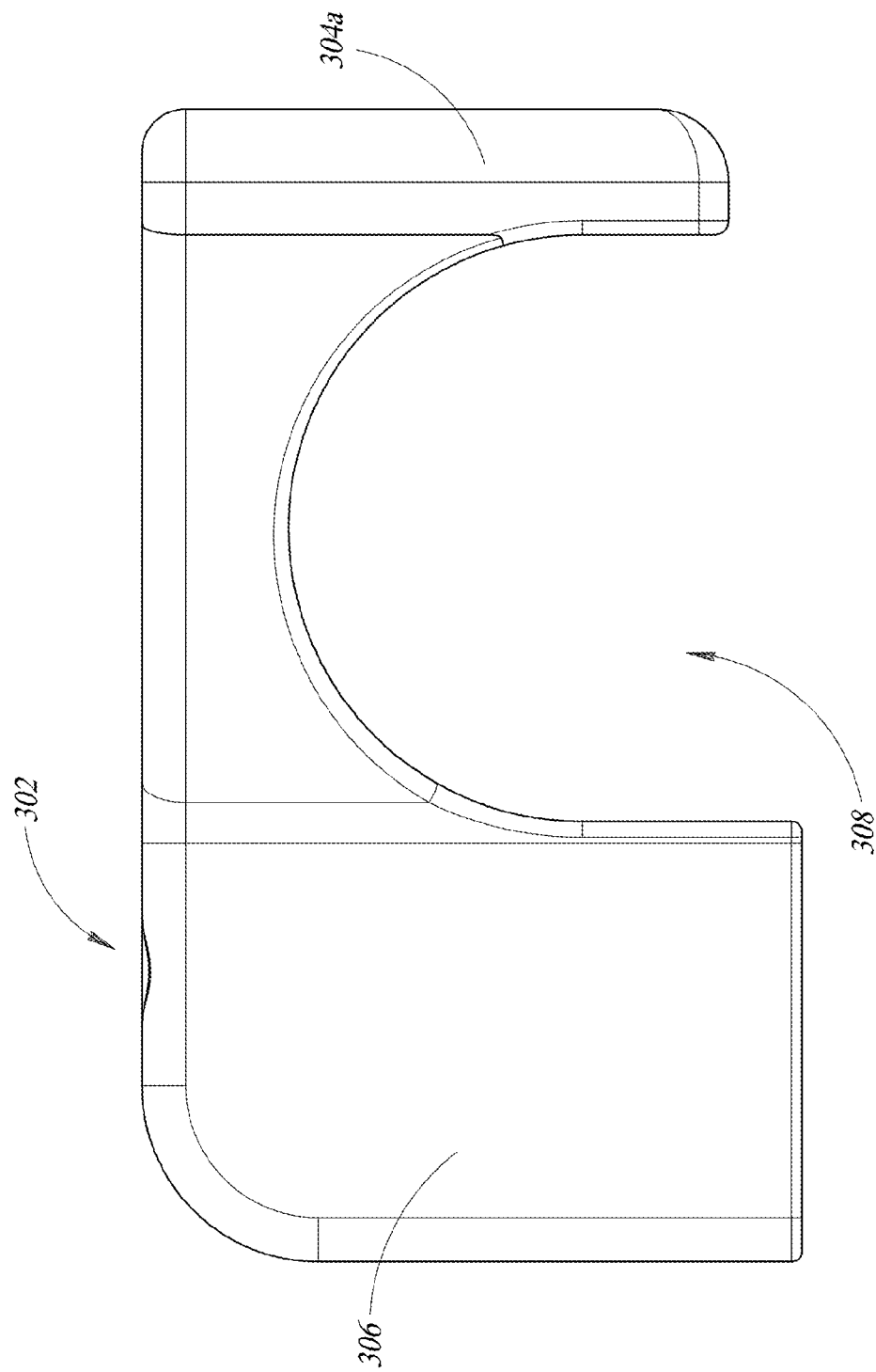
FIG. 8 is side elevation view of the device retention hook of FIG. 7, according to at least one illustrated embodiment.
Figure 9:
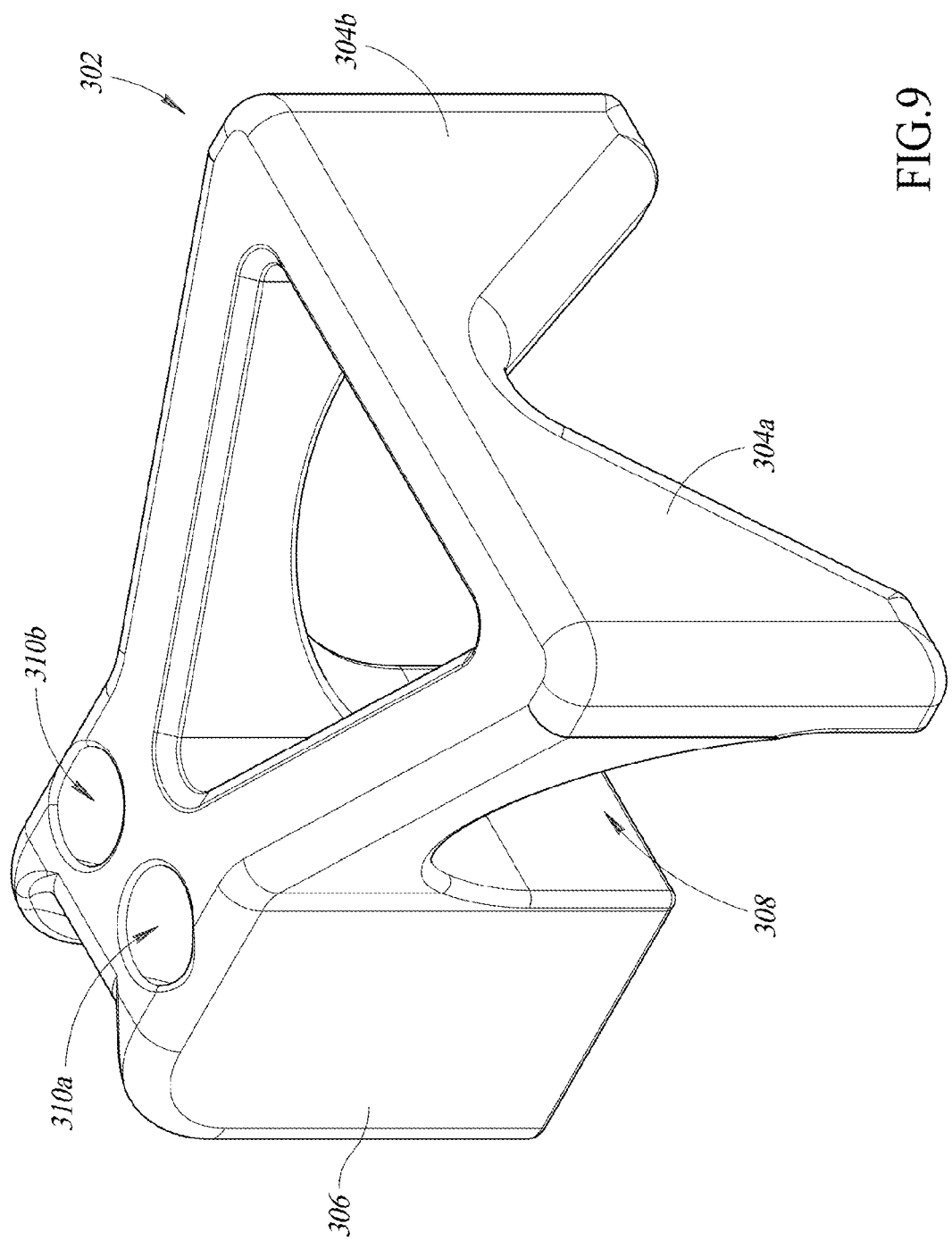
FIG. 9 is an isometric view of the device retention hook of FIG. 7, according to at least one illustrated embodiment.
Figure 10:
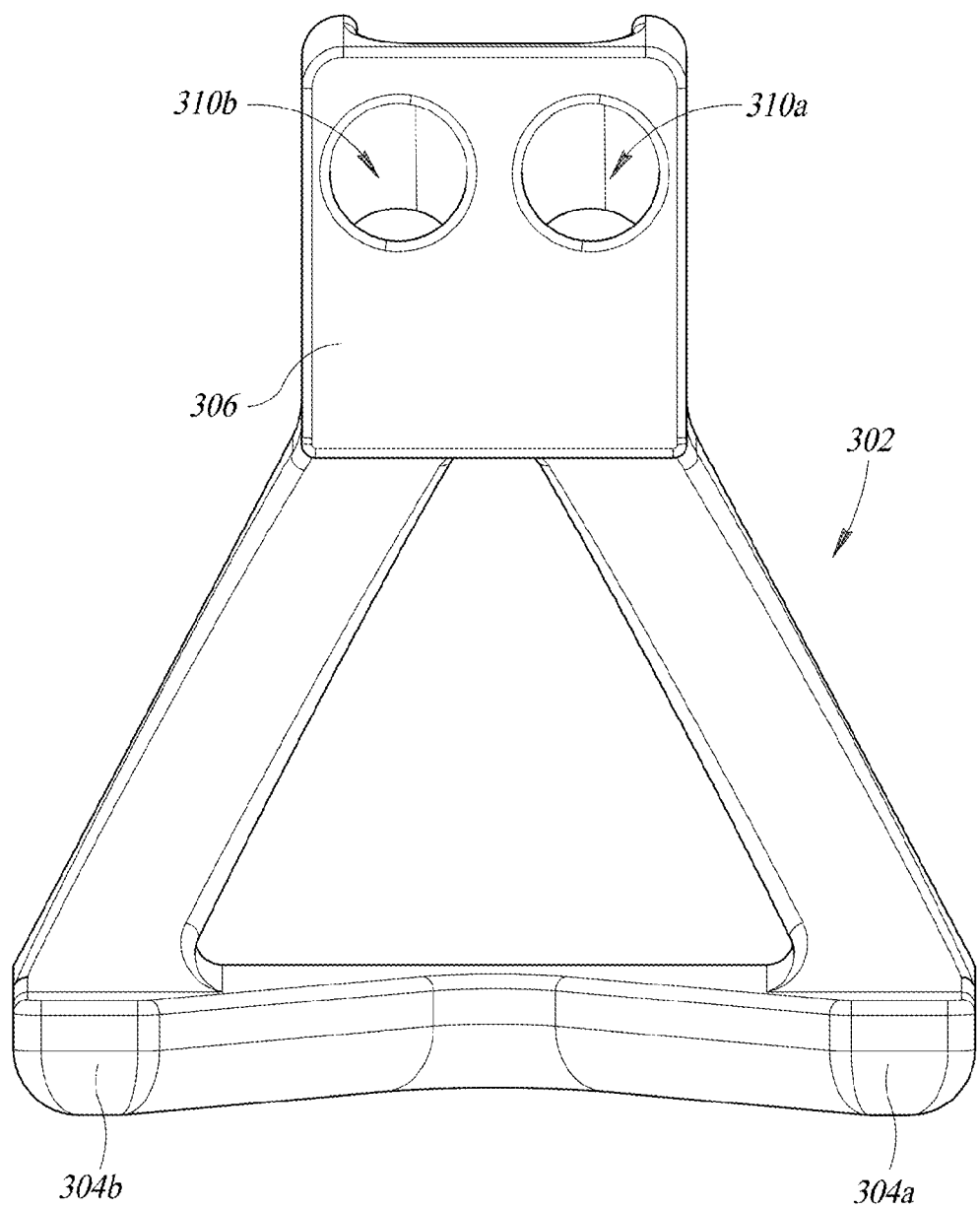
FIG. 10 is a bottom view of the device retention hook of FIG. 7, according to at least one illustrated embodiment.

FIGS. 7-10 show an example device retention hook 302 of a holder apparatus, according to at least one illustrated embodiment. In particular, FIG. 7 shows a top plan view of the device retention hook 302; FIG. 8 shows a side elevational view of the device retention hook 302; FIG. 9 shows an isometric view of the device retention hook 302; and FIG. 10 shows a bottom view of the device retention hook 302.

The device retention hook 302 is sized and shaped to receive an edge of an object to be held. In particular, the device retention hook 302 may receive a first edge of the object and the platform 102 may physically engage or otherwise receive a second edge of the object that is opposite the first edge. The object may be a book, a portable electronic device, a file, a folder, or other object.

As best shown in FIGS. 8 and 9, the device retention hook 302 may have three legs. For example, the device retention hook 302 may have a front pair of legs 304a and 304b positioned parallel to one another to engage a front portion of the object being held (e.g., portable electronic device). The device retention hook 302 may also have a rear leg 306 positioned to engage a rear portion of the object being held.

As another example, as best shown in FIGS. 18A-C, the device retention hook can have two legs, including a solitary front leg 304c to engage a front portion of the object being held (e.g., portable electronic device) and a rear leg 306 positioned to engage a rear portion of the object being held. The device retention hook 302 may have other shapes than those illustrated. For example, the device retention hook 302 may have two legs similar to supporting hook 202, may have four legs, or other shapes.

The device retention hook 302 may have one or more passageways. For example, as illustrated best in FIGS. 7, 9, 10, the device retention hook 302 includes a pair of passageways 310a and 310b. A bias member may extend through the passageways 310a and 310b to physically couple the bias member to the device retention hook 302, as will be discussed further with reference to FIG. 11. As another example, as illustrated best in FIG. 18A the device retention hook 302 can include a passageway through which an elastic band 308 extends but through which a tab 316 may not pass.

The device retention hook 302 may be plastic (e.g., reinforced plastic), metal, or other materials. In some implementations, the device retention hook 302 is a single piece of molded plastic. In some implementations, a three-dimensional printing procedure or apparatus creates the device retention hook 302.

Figure 11:
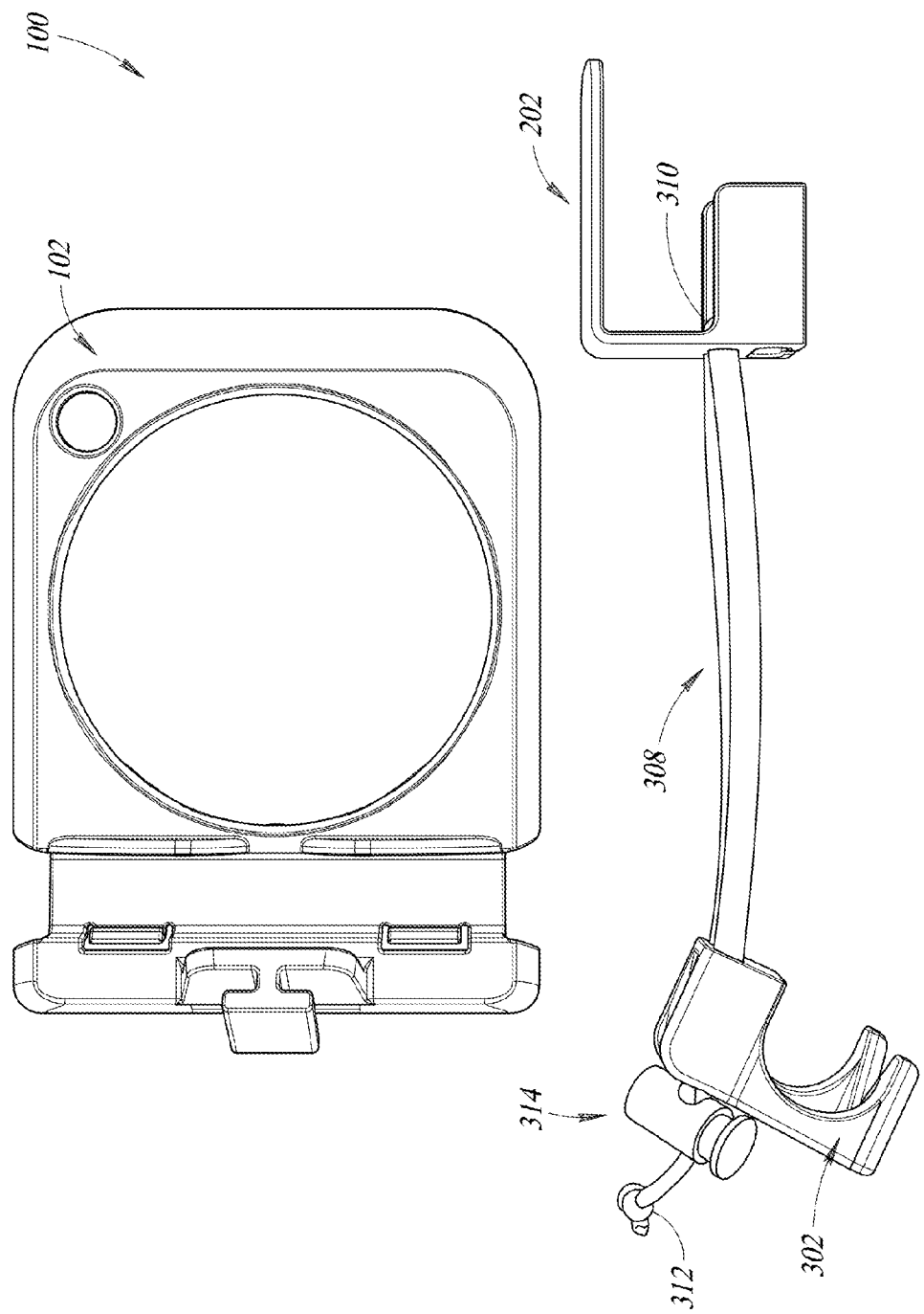
FIG. 11 shows the holder apparatus with the platform not physically coupled to the supporting hook, according to at least one illustrated embodiment.

FIG. 11 shows the holder apparatus 100 with the platform 102 not physically coupled to the supporting hook 202, according to at least one illustrated embodiment. Furthermore, FIG. 11 shows a bias member 308 that physically couples the device retention hook 302 to the supporting hook 202. In other implementations, the bias member 302 physically couples the device retention hook 302 to the platform 102 in addition to or alternatively to the supporting hook 202.

The bias member 308 biases the device retention hook 302 toward the platform 102 when an object (e.g., portable electronic device) is positioned between the device retention hook 302 and at least one of the platform 102 and the supporting hook 202. As an example, the bias member 308 can be a spring or other elastically deformable mechanical structure. As another example, as shown in FIG. 11, the bias member 308 can be an elastic cord.

The bias member 308 has a first end 310 that is physically coupled to the supporting hook 202 and a second end 312 that is physically coupled in to the device retention hook 302. In other embodiments, the first end 310 of the bias member 308 is physically coupled to the platform 102 in addition to or alternatively to the supporting hook 202.

More particularly, in some implementations, as shown in FIG. 11, the bias member 308 may be a length of elastic cord, where the elastic cord passes through a first passageway 310 of the device retention hook 302 in a first direction, passes through a first passageway 210 of the supporting hook 202 in the first direction, passes through a second passageway 210 of the supporting hook 202 in a second direction that is opposite to the first, and passes through a second passageway 310 of the device retention hook 302. Portions of the elastic cord adjacent to the device retention hook 302 may be physically coupled together in a knot, for example as shown in FIG. 11, or other coupling structure.

FIG. 11 further shows a cord lock 314 physically coupled to the bias member 308. A position of the cord lock 314 relative to the bias member 308 is adjustable to adjust a second position at which the device retention hook 302 is maintained relative to the bias member 308 when the bias member 308 is elastically deformed. The cord lock 314 may be replaced with other components that are slidably adjustable relative to the bias member 308 and/or that provide selective clamping force.

As another example, as shown in FIGS. 18A-C, 19A-B, 20A-B, and 21A-B, the bias member 308 can be an elastic band. As illustrated best in FIGS. 18A-C, the elastic band 308 can have or otherwise be physically coupled to respective tabs 316 and 318 at opposite ends of the band. The tab 316 can secure the elastic band 308 relative to the device retention hook 302. The tab 318 can secure the elastic band 308 relative to the platform 102, the intermediate portion 201, and/or the supporting hook 202. For example, the tab 318 can be sized to prevent passing through an opening in the intermediate portion 201. The tab 316 can be sized to prevent passing through an opening in the device retention hook 302.

Figure 12:
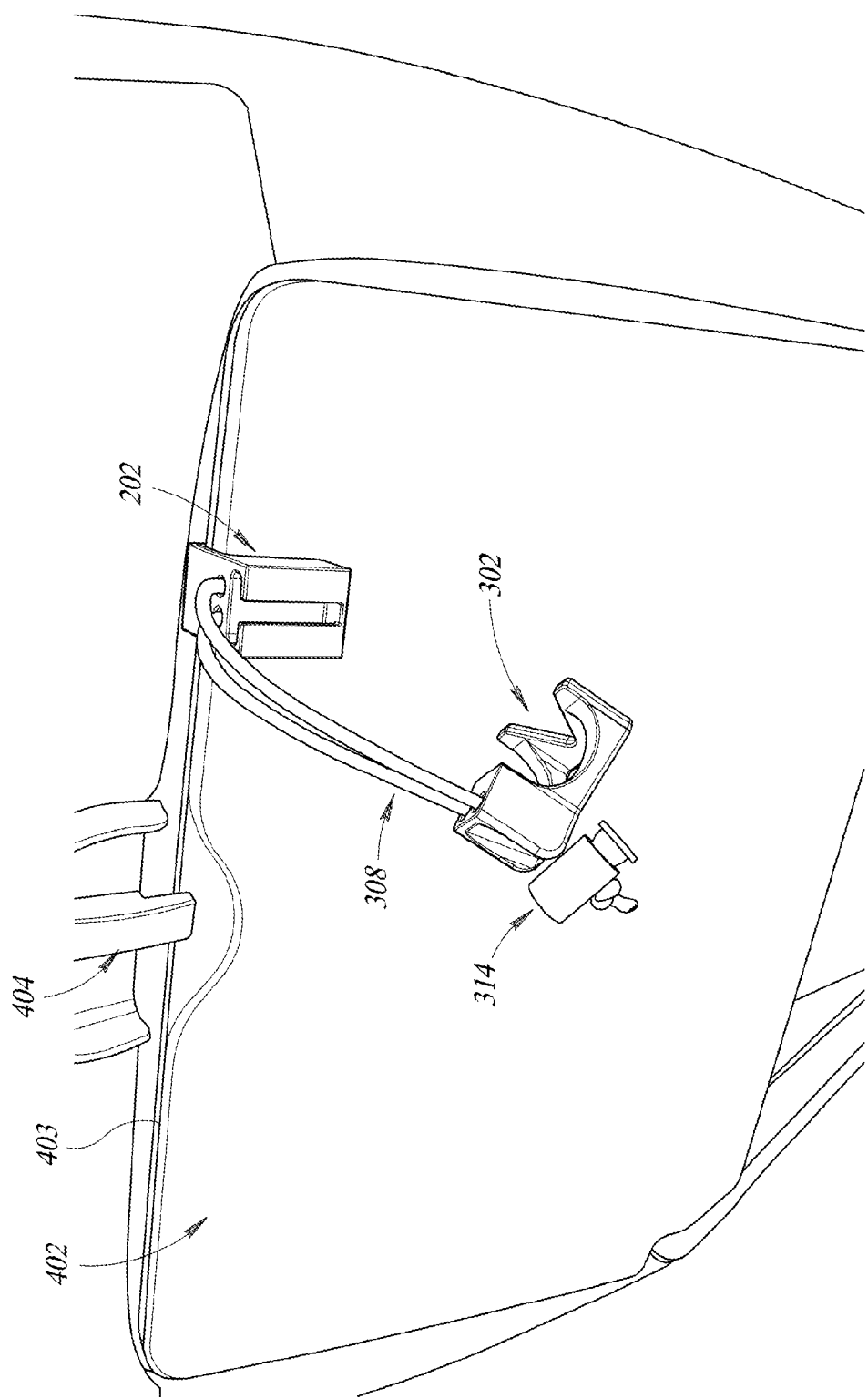
FIG. 12 shows the supporting hook engaged with an edge of a fold down tray table, according to at least one illustrated embodiment.

FIG. 12 shows the supporting hook 202 engaged with an edge 403 of a fold down tray table 402, according to at least one illustrated embodiment. In particular, the edge 403 of the fold down tray table 402 is received in an opening between first and second legs of the supporting hook 202. The second leg of the supporting hook is positioned between the fold down tray table 402 and the seat structure. The fold down tray table 402 is held in the upright position by a tray table latch 404. The supporting hook 202 is not coupled to the platform 102 in FIG. 12.

Figure 13:
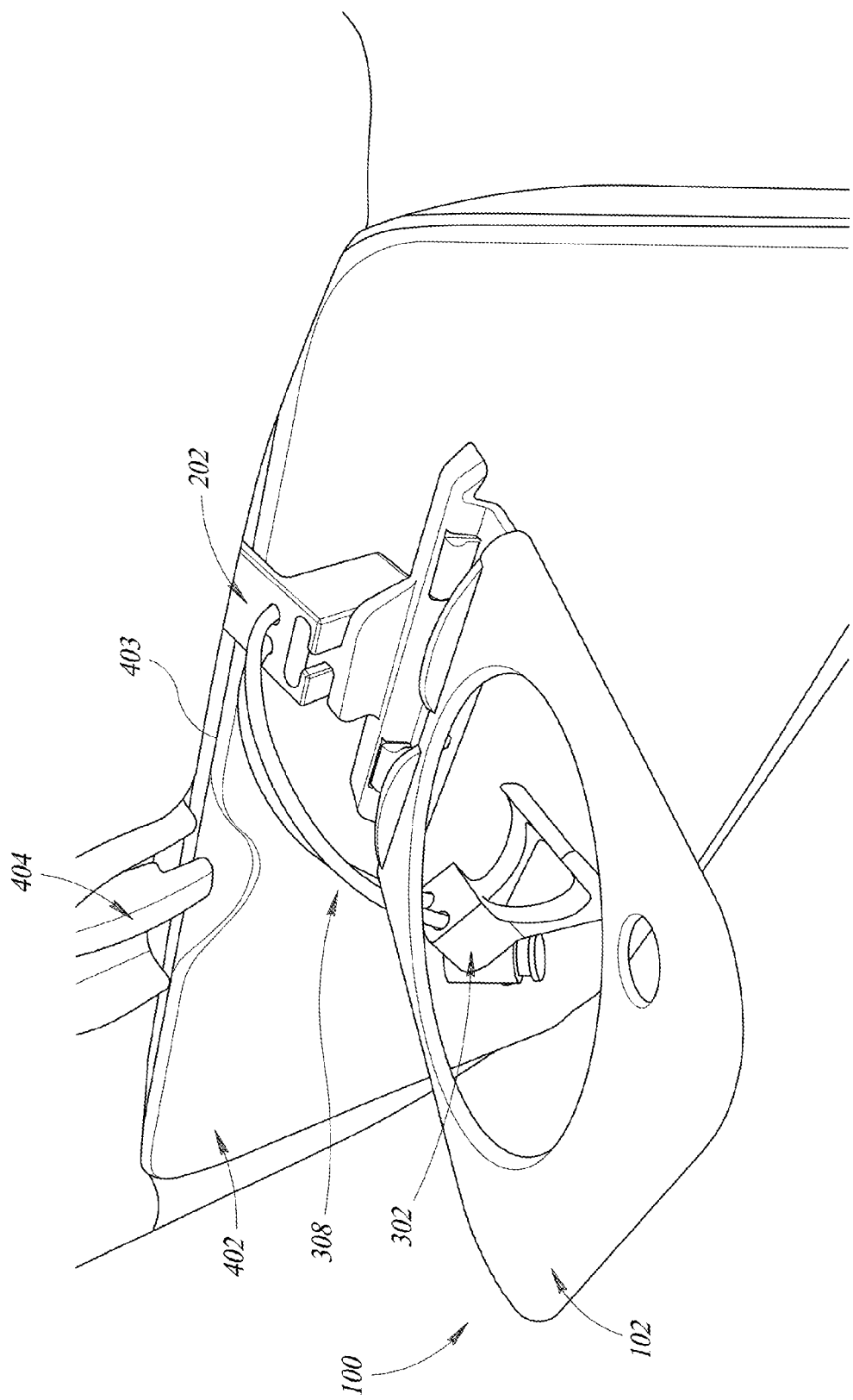
FIG. 13 shows the holder apparatus coupled to the fold down tray table, according to at least one illustrated embodiment.

FIG. 13 is similar to FIG. 12 except that the platform 102 is coupled to the supporting hook 202 in FIG. 13. The supporting hook 202 supports the platform 102 from the fold down tray table 402.

Figure 14:
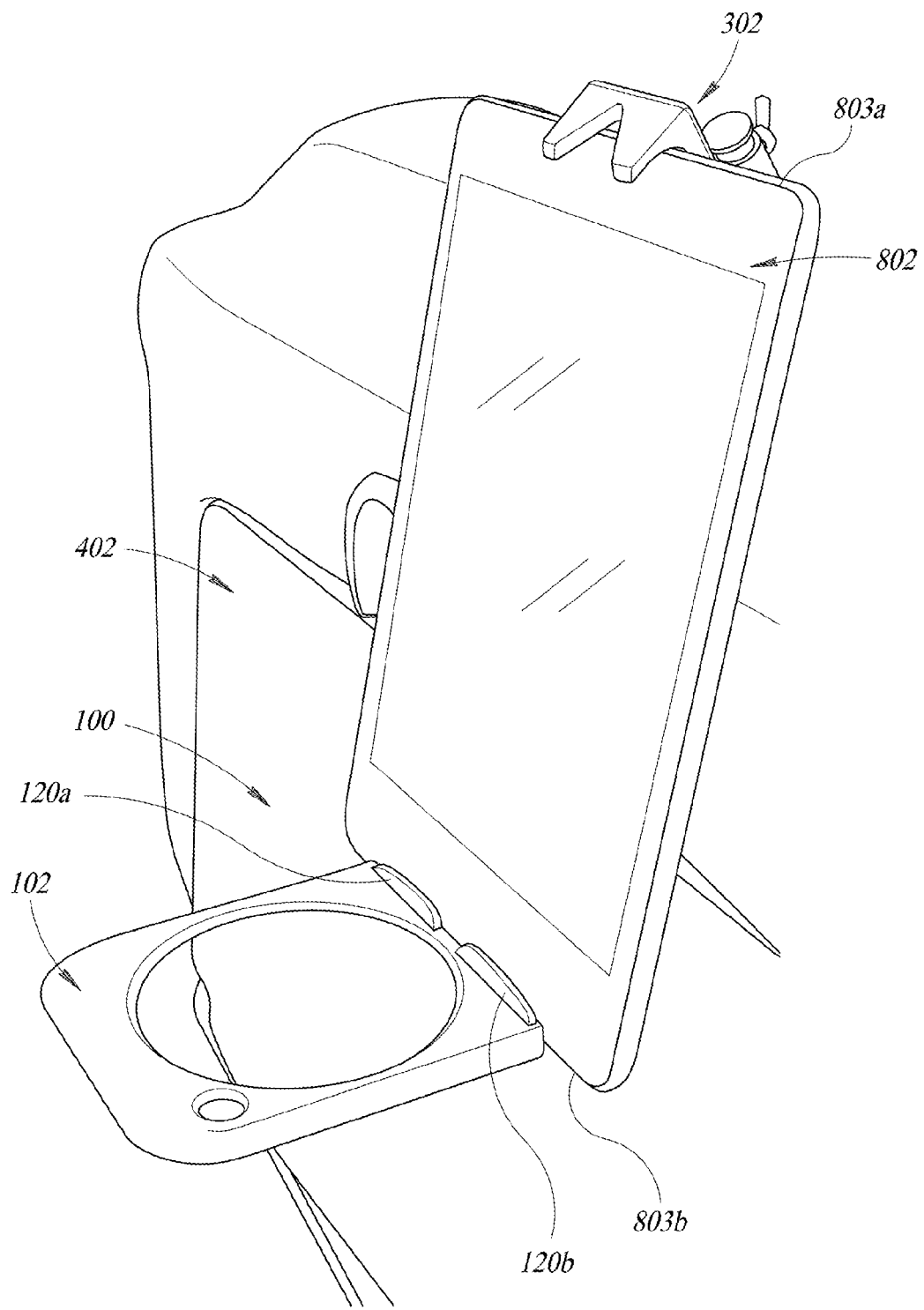
FIG. 14 shows the holder apparatus coupled to the fold down tray table and holding a tablet computing device in a portrait configuration, according to at least one illustrated embodiment.

FIG. 14 shows the holder apparatus 100 coupled to the fold down tray table 402 and holding a tablet computing device 802 in a portrait configuration. In particular, the device retention hook 302 receives and holds a first edge 803a of the tablet computing device 802 while the platform 102 receives and holds a second edge 803b that is opposite the tablet computing device 802 from the first edge 803a. In other implementations, the supporting hook 202 holds the second edge 803b.

Figure 15:
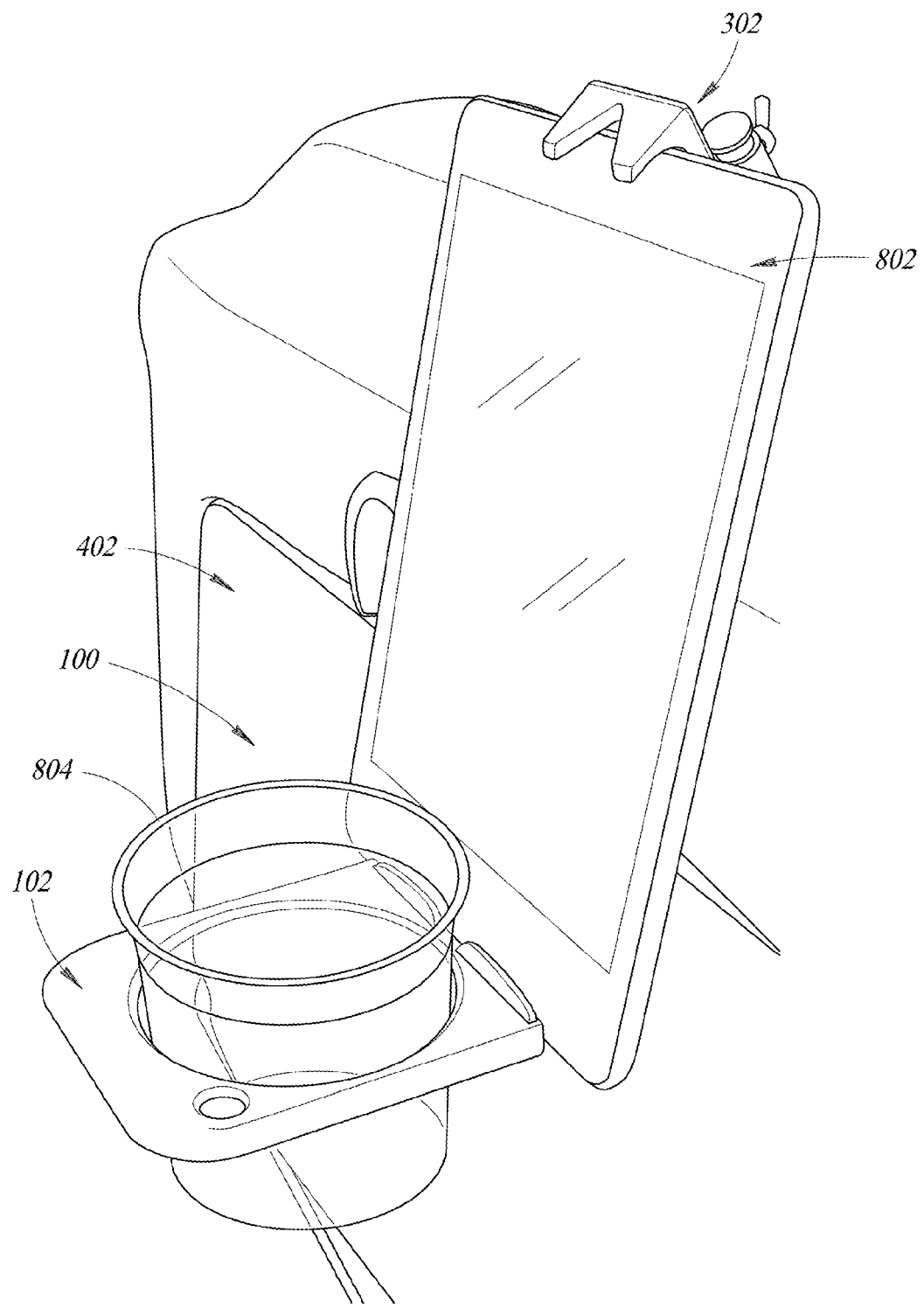
FIG. 15 shows the holder apparatus coupled to the fold down tray table and holding the tablet computing device and a drinking cup, according to at least one illustrated embodiment.
Figure 16:
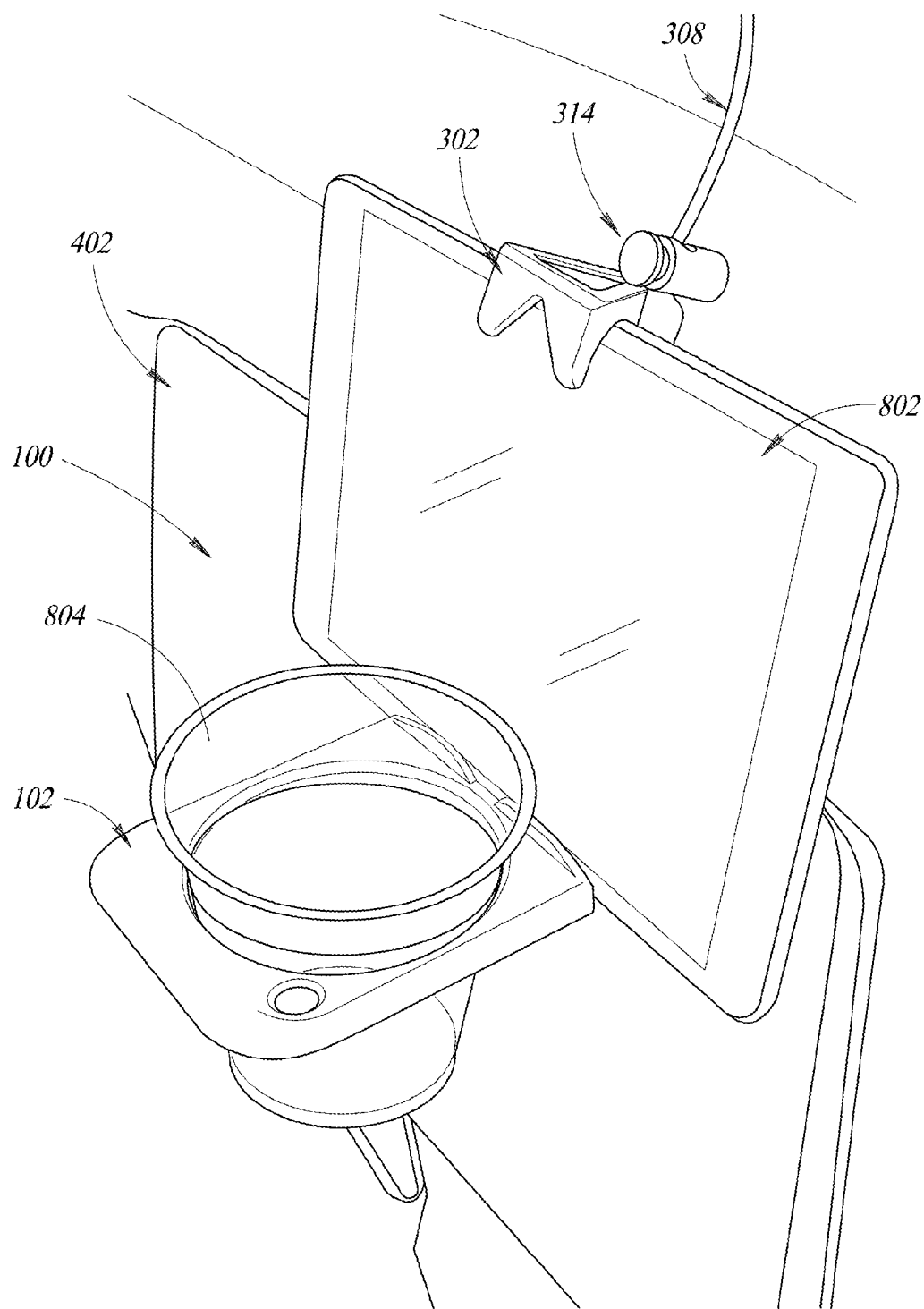
FIG. 16 shows the holder apparatus coupled to the fold down tray table and holding the drinking cup and the tablet computing device in a landscape configuration, according to at least one illustrated embodiment.

FIG. 15 is similar to FIG. 14 except that it shows the platform 102 of the holder apparatus 100 holding a drinking cup 804 in addition to the tablet computing device 802. FIG. 16 is similar to FIG. 15 except that it shows the holder apparatus 100 holding the tablet computing device 803 in a landscape configuration rather than a portrait configuration. Although the tablet computing device 802 is shown in FIGS. 14-16 as not having a sleeve, case, or other protective or decorative cover thereon, such representation is not limiting. In particular, the holder apparatus 100 can hold portable electronic devices or other objects having such covers thereon.

Figure 17:
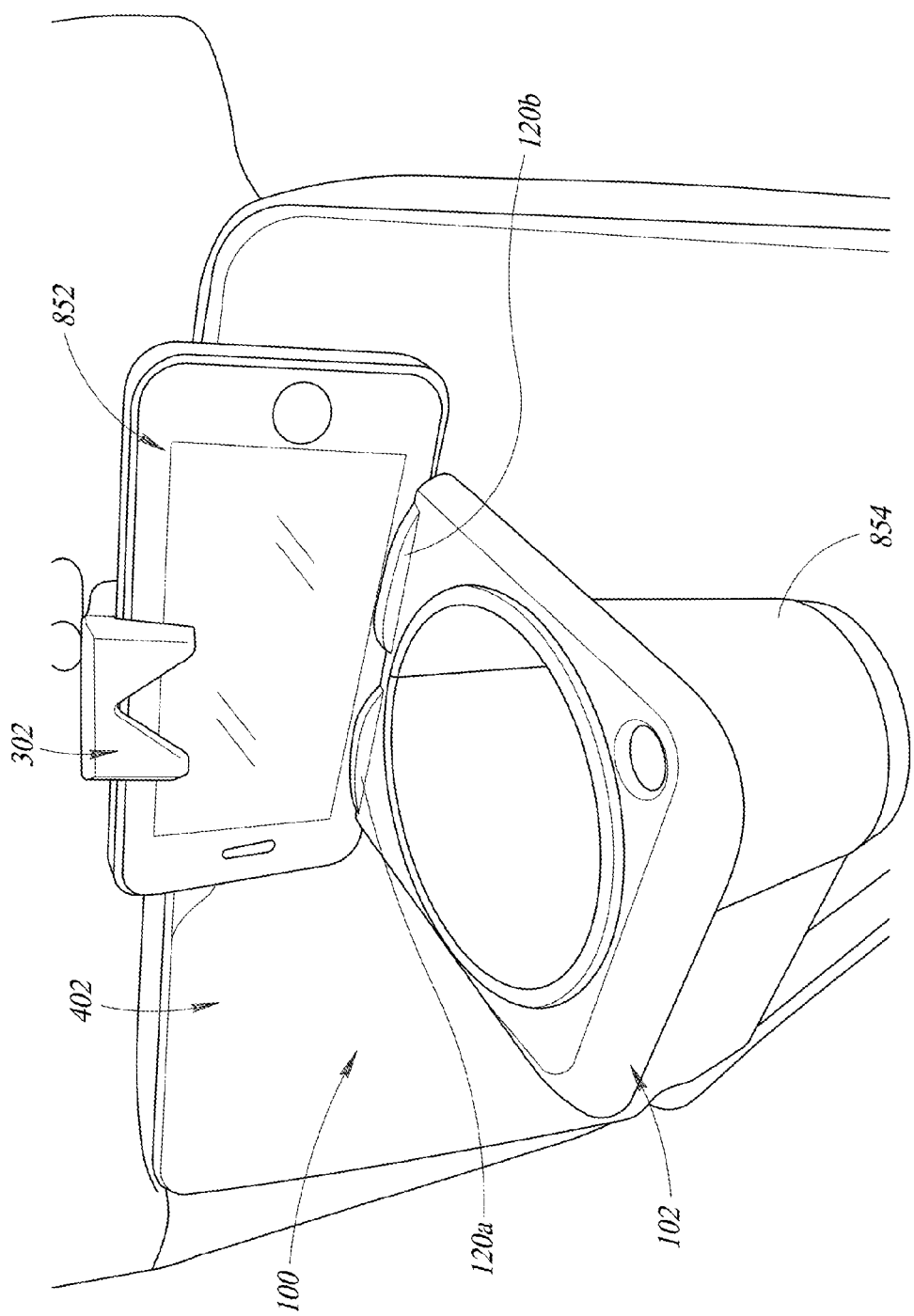
FIG. 17 shows the holder apparatus coupled to the fold down tray table and holding a drinking cup and a smartphone in a landscape configuration, according to at least one illustrated embodiment.

FIG. 17 is similar to FIG. 16 except that it shows the holder apparatus 100 holding a smartphone 852 instead of a tablet computing device 802. Thus, the holding apparatus 100 can easily be adjusted to hold objects (e.g., portable electronic devices) of different sizes. In particular, a first position of the cord lock 314 relative to the bias member 308 can be slidably adjusted (e.g., by depressing a spring-biased component of the cord lock 314) to adjust a second position at which the device retention hook 302 is maintained relative to the bias member 308. Thus, by "tightening" or "loosening" the cord lock 314 and device retention hook 302, the apparatus 100 can be adjusted to hold objects of different sizes.

In addition, FIG. 17 shows the platform 102 holding and supporting a drinking cup 854 that has a relatively smaller diameter than the drinking cup 804. Thus, the holder apparatus can accommodate drinking cups of different sizes.

In some implementations, at least one of the platform 102, the intermediate portion 201, and the supporting hook 202 may include a clamp physically coupled thereto. The clamp can assist in securing the holder apparatus to the airline tray table. In particular, the airline tray table can be clamped in the opening 204 of the supporting hook 202.

As one example, as illustrated in FIGS. 20A and 20B, a clamp 502 is physically coupled to the intermediate portion 201. However, in other implementations, the clamp 502 may be secured to the platform 102 or the supporting hook 202.

The clamp 502 includes a clamp body 504, a clamp member 506, a head 508, and a cap 510. The position of the clamp member 506 relative to the clamp body 504 can be selectively adjusted to move the clamp member 506 closer or father away from the leg 206 of the supporting hook 202. For example, the clamp member 506 and the clamp body 504 may have complementary threading such that rotation of the member 506 changes the position of the member 506 relative to the body. As another example, the clamp member 506 and clamp body 504 may have other selectively adjustable complementary mating structures such as spring loaded clamping, teeth or detents, etc.

Thus, rotation of the clamp member 506 (e.g., resulting from manual rotation of the head 508) can cause the clamp member to move closer to the leg 206 until the cap 510 engages a first side of the airline tray table and presses a second side of the airline tray table against the leg 206 of the supporting hook 202. The cap 510 can be rubber, plastic, or other soft and/or gripping materials. The clamp 502 allows the holder apparatus to be tightly secured to multiple airline tray tables that have different thicknesses.

Those of skill in the art will recognize that many of the methods or algorithms set out herein may employ additional acts, may omit some acts, and/or may execute acts in a different order than specified.

The various embodiments described above can be combined to provide further embodiments. In particular, various features have been separately shown in different figures to avoid obscuring certain features through depiction of others. The separate depiction of features in such fashion does not prevent or teach away from the combination of such features in a single apparatus or imply that such features represent distinct embodiments. Aspects of the embodiments can be modified, if necessary, to employ systems, concepts, or aspects of various patents, applications and publications to provide yet further embodiments.

All of the U.S. patents, U.S. patent application publications, U.S. patent applications, foreign patents, foreign patent applications and non-patent publications referred to in this specification and/or listed in the Application Data Sheet, if any, including but not limited to: U.S. Provisional Patent Application No. 61/988,190, titled "Hook that locks into airline tray table allowing for hanging of objects", filed May 3, 2014; and U.S. Provisional Patent Application No. 62/131,720, titled "HOLDER APPARATUS FOR DETACHABLE COUPLING TO FOLD DOWN TRAY TABLE", filed Mar. 11, 2015 are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A holder apparatus for detachable coupling to fold down tray tables of seats, the holder apparatus comprising:
   a platform having a primary aperture sized to supportingly receive a drinking cup partially extending therethrough;
   a supporting hook having an opening sized and shaped to receive an edge of a fold down tray table therein, the supporting hook which at least in use is physically coupled to the platform to support the platform from the fold down tray table while the fold down tray table is in an upright configuration;
   a device retention hook sized and shaped to receive an edge of a portable electronic device; and
   a bias member that physically couples the device retention hook to at least one of the platform or the supporting hook and which biases the device retention hook toward the platform when the portable electronic device is positioned between the device retention hook and at least one of the platform or the supporting hook.

2. The holder apparatus of claim 1 wherein the platform has a rectangular top plan view profile and the primary aperture is circular and extends completely through the platform from a top through a bottom thereof.

3. The holder apparatus of claim 1 wherein the platform has a secondary aperture sized and dimensioned to supportingly receive a writing implement at least partially extending therethrough.

4. The holder apparatus of claim 1 wherein the supporting hook is selectively removably coupleable to the platform via at least one pair of complementary mating structures.

5. The holder apparatus of claim 1 wherein the platform includes at least one flexure portion between an outer edge of the platform and a respective complementary mating structure of the platform.

6. The holder apparatus of claim 1 wherein the platform includes at least one tab and the supporting hook includes at least one slot sized and dimensioned to removably physically secure the supporting hook to the platform.

7. The holder apparatus of claim 6 wherein the tab of the platform has a T-shaped profile and the at least one slot of the supporting hook is sized and dimensioned to removably receive the tab of the platform.

8. The holder apparatus of claim 1 wherein the supporting hook has a U-shaped profile with a first leg of the U-shaped profile longer than a second leg of the U-shaped profile, the longer leg positionable relatively behind the fold down tray table while the fold down tray table is in the upright configuration.

9. The holder apparatus of claim 1 wherein the device retention hook has three legs, a front pair of legs positioned parallel to one another to engage a front portion of the portable electronic device in use, and a rear one of the legs positioned to engage a rear portion of the portable electronic device in use.

10. The holder apparatus of claim 1 wherein the bias member comprises an elastic member having a first end physically coupled to the supporting hook and a second end physically coupled to the device retention hook.

11. The holder apparatus of claim 10, further comprising:
a cord lock physically coupled to the elastic member, a position of the cord lock relative to the elastic member adjustable to adjust a second position at which the device retention hook is maintained relative to the elastic member.

12. The holder apparatus of claim 1 wherein the platform has at least one lip extending from a top of the platform.

13. The holder apparatus of claim 1 wherein the device retention hook is sized and shaped to receive a first edge of the portable electronic device, and the platform includes a groove sized and shaped to receive a second edge of the portable electronic device, the second edge of the portable electronic device opposite the first edge of the portable electronic device.

14. A holder apparatus for detachable coupling to fold down tray tables of seats, the holder apparatus comprising:
a platform having a primary aperture sized to supportingly receive a drinking cup partially extending therethrough;
a supporting hook having an opening sized and shaped to receive an edge of a fold down tray table therein, the supporting hook which at least in use is physically coupled to the platform to support the platform from the fold down tray table while the fold down tray table is in an upright configuration;
a device retention hook sized and shaped to receive an edge of a portable object; and
a bias member that physically couples the device retention hook to at least one of the platform or the supporting hook and which biases the device retention hook toward the platform when the portable object is positioned between the device retention hook and at least one of the platform or the supporting hook.

* * * * *